US007322667B2

(12) United States Patent
Zhang

(10) Patent No.: US 7,322,667 B2
(45) Date of Patent: Jan. 29, 2008

(54) LIQUID DETECTING METHOD AND LIQUID DETECTING SYSTEM

(75) Inventor: Junhua Zhang, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 231 days.

(21) Appl. No.: 11/179,928

(22) Filed: Jul. 12, 2005

(65) Prior Publication Data

US 2006/0012620 A1 Jan. 19, 2006

(30) Foreign Application Priority Data

Jul. 14, 2004 (JP) .......................... P2004-207491
Jul. 14, 2004 (JP) .......................... P2004-207601

(51) Int. Cl.
*B41J 29/393* (2006.01)
*B41J 2/195* (2006.01)
*G01F 23/00* (2006.01)
*G01F 23/28* (2006.01)

(52) U.S. Cl. .......................... 347/19; 347/7; 73/290 V

(58) Field of Classification Search ................. 347/19, 347/7; 73/290 V
See application file for complete search history.

(56) References Cited

U.S. PATENT DOCUMENTS

2001/0052627 A1* 12/2001 Takahashi et al. .......... 257/415
2003/0103119 A1* 6/2003 Sakai et al. .................. 347/92

FOREIGN PATENT DOCUMENTS

JP 2001-146024 A 5/2001

* cited by examiner

*Primary Examiner*—Julian D. Huffman
(74) *Attorney, Agent, or Firm*—Stroock & Stroock & Lavan LLP

(57) ABSTRACT

A liquid detecting method of detecting liquid in a liquid container used on a liquid ejector by use of a liquid sensor. There are included a head cleaning step of performing a head cleaning operation after maintaining for a predetermined time or longer a state there is no flow of fluid into/from the cavity through the liquid supply port and liquid discharge port, and a detecting step of detecting a presence/absence of liquid by applying a drive signal to the piezoelectric device of the liquid sensor after the head cleaning process.

40 Claims, 16 Drawing Sheets

LIQUID DETECTING METHOD AND LIQUID DETECTING SYSTEM

This application is based on Japanese Patent application JP 2004-207491 and JP 2004-207601, both filed Jul. 14, 2004, the entire contents of which are hereby incorporated by reference. This claim for priority benefit is being filed concurrently with the filing of this application.

BACKGROUND OF THE INVENTION

1. Technical Field of the Invention

The present invention relates to a liquid detecting method and liquid detecting system for detecting a liquid in a liquid container used on a liquid ejector.

2. Description of the Related Art

The conventional liquid ejectors include, as representative examples, an inkjet recorder having a inkjet recording head for image recording. As other liquid ejectors, there are an apparatus having a color-material ejection head for use in the manufacture of a color filter such as of a liquid display, an apparatus having an electrode-material (conductor paste) ejection head for use in forming an electrode for an organic EL display, a surface-emission display (FED) or the like, an apparatus having an bio-organic ejection head for use in the manufacture of a bio-chip and an apparatus having a sample-ejection head as a precision pipette, for example.

The inkjet recorder as a representative example of the liquid ejector is mounted, on a carriage, with an inkjet recording head having pressure generating means for pressurizing a pressure generating chamber and a nozzle opening for ejecting pressurized ink in the form of an ink droplet.

The inkjet recorder is structured to continue printing by continuously supplying the ink in an ink container to the recording head through a flow path. The ink container is structured as a removal cartridge which the user is allowed to exchange when the ink is consumed up, for example.

Conventionally, the cartridge ink consumption managing methods includes a method of managing ink consumption by a calculation of totalizing, on software, the number of ejections at the recording head or the amount of ink sucked in maintenance, a method of managing a time the ink is actually consumed a predetermined quantity by attaching a liquid-level-detection electrode to the ink cartridge, and so on.

However, in the method of managing the ink consumption by a calculation of totalizing, on software, the number of ejections of ink droplets or the amount of ink, there is the following problem. Of heads, there are those having weight variations between ink droplets ejected. The weight variations between ink droplets do not have an effect upon image quality. However, the ink cartridge is charged with ink in an amount with a margin, taking into consideration of cumulative ink consumption errors due to the variations. Accordingly, there arises a problem that the amount of ink corresponding to the margin is left in a certain individual.

Meanwhile, the method of managing with electrodes the time the ink is consumed up is to detect the actual amount of ink, allowing for managing the ink remaining quantity with reliability. However, this relies upon the electric conductivity of ink in detecting an ink level, thus having a defect that detectable ink is limited in kind or electrode seal structure is complicated. Meanwhile, the electrode uses usually a material of precious metal well in electric conductivity and high in corrosion resistance, mounting up the manufacture cost of the ink cartridge. Furthermore, the need of attaching two electrodes increases the manufacturing process with a result of increased manufacture cost.

There is an apparatus developed to solve such a problem, disclosed as a piezoelectric device in JP-A-2001-146024. This piezoelectric device is to detect a liquid remaining quantity correctly but eliminated the necessity of a complicated seal structure so that it can be attached and used on a liquid container.

Namely, according to the piezoelectric device described in JP-A-2001-146024, the ink remaining quantity in the ink cartridge can be monitored by utilization of the nature that there is a change in the resonant frequency to the residual vibration signal occurring due to the residual vibration (free vibration) on a piezoelectric-device vibration portion after forcibly vibrated on a drive pulse, between the cases of a presence of ink in a space opposed to the piezoelectric-device vibration portion and of an absence of ink therein.

FIG. 16 shows an actuator structuring a conventional piezoelectric device. This actuator 106 has a substrate 178 having a circular opening 161 nearly in the center, a vibration plate 176 arranged on one surface (hereinafter, referred to as a "surface") of the substrate 178 in a manner covering the opening 161, a piezoelectric layer 160 arranged on a side close to the surface of the vibration plate 176, an upper electrode 164 and a lower electrode 166 that sandwich the piezoelectric layer 160 at respective sides, an upper electrode terminal 168 electrically coupled to the upper electrode 164, a lower electrode terminal 170 electrically coupled to the lower electrode 166, and an auxiliary electrode 172 arranged between the upper electrode 164 and the upper electrode terminal 168 and electrically coupling the both together.

The piezoelectric layer 160, the upper electrode 164 and the lower electrode 166 have respective circular portions as their main portions. The circular portions of the piezoelectric layer 160, upper electrode 164 and lower electrode 166 form a piezoelectric device.

The vibration plate 176 is formed on the surface of the substrate 178 in a manner covering the opening 161. A vibration region for actual vibration of the vibration plate 176 is determined by the opening 161. A cavity 162 is formed by an area of vibration plate facing the opening 161 and the opening 161 in the substrate (cavity forming member) 178. The opposite surface of substrate 178 to the piezoelectric device (hereinafter, referred to as a "back surface") faces the inward of the ink container. Due to this, the cavity 162 is structured in contact with the liquid (ink). Incidentally, the vibration plate 176 is attached for liquid-seal on the substrate 178 in order not to leak liquid to the surface of the substrate 178 even if liquid intrudes in the cavity 162.

In the actuator 106 of the prior art, the residual vibration (free vibration) at the vibration portion, caused after forcibly vibrating the vibration portion through the application of a drive pulses to the piezoelectric device, is to be detected as an inverse electromotive force by means of the same piezoelectric device. Thus, the ink remaining quantity in the ink container can be detected by utilization of a change in the residual vibration state of the vibration portion before and after a passage of the liquid level in the ink container beyond the arrangement position of the actuator (exactly, cavity 162 position).

Meanwhile, in FIGS. 6 to 8 in JP-A-2001-146024, there is shown a structure that the cavity has a length in a direction of extracting the upper and lower electrode made longer than its length in a direction orthogonal thereto.

The conventional actuator (piezoelectric device) 106 mentioned above is structured to expose the cavity 162, attached in the container wall of the container body 181 of the ink cartridge 180 as shown in FIG. 17 and for receiving the ink as a subject-of-detecting, to an ink reservoir space in the interior of the ink container 180.

However, in the conventional actuator (piezoelectric device) 106, because of a structure to expose the cavity 162 to the ink reservoir space in the ink container 180, if an air bubble occurs in the ink of the ink cartridge 180 due to vibration or so, the air bubble easily intrudes into the cavity 162 of the actuator 106. In case the air bubble intrudes into the cavity 162 and stays there, the resonant frequency to residual vibration to be detected by the actuator 106 advances in time regardless of a sufficient amount of remaining ink in the ink cartridge 180. Thus, there is a problem of an erroneous detection of a reduced ink remaining quantity because the liquid level passed the position of actuator 106.

Meanwhile, in case the cavity 162 of actuator 106 is reduced in size in order to detect the liquid-level passage timing with accuracy, ink meniscus is readily formed in the cavity 162. Consequently, there is a problem that the ink is to remain in the cavity 162 despite the liquid level passed the position of cavity 162 as the ink is consumed, resulting in an erroneous decision of not yet passed the liquid level beyond the position of actuator 106 and there is a sufficient amount of remaining ink.

In order to solve the above problem, it can be considered to provide a liquid sensor with an ink supply path for supplying ink to the cavity and an ink discharge path for discharging ink from the cavity, as proposed in Japanese Patent Application No. 2004-122763 filed by the present applicant.

However, in the liquid sensor having the ink supply path and ink discharge path, there is a problem as in the following.

Namely, in the state the in cartridge ink is continuously consumed during head cleaning or print operation, fluid flow (ink and/or air) takes place in the cavity of the liquid sensor.

There is a phenomenon that the ink put on the cavity wall surface is not easily discharged even when the remaining ink decreases into a state that air is to pass the interior of the cavity.

In case to detect a presence/absence of ink in the state ink is put on the cavity wall surface in this manner, there is a possibility of a decision of a presence of ink despite it is in a state normally to be decided as an absence of ink.

SUMMARY OF THE INVENTION

The present invention has been made in consideration of the foregoing situation, and it is an object thereof to provide a liquid detecting method and liquid detecting system capable of positively deciding a presence/absence of liquid. Furthermore, another object is to provide a liquid detecting method and liquid detecting system capable of positively deciding a presence/absence of liquid without lowering the throughput on the liquid ejector.

The present invention can provide, as illustrative, non-limiting embodiment, the following arrangements:

(1). A liquid detecting method for detecting liquid in a liquid container used in a liquid ejector using a liquid sensor, wherein the liquid sensor comprises:

a vibration cavity forming base portion having a first surface and a second surface opposite to each other, in which a cavity for receiving the liquid as a detection object is opened at a side of the first surface, and a bottom of the cavity is capable of vibrating;

a piezoelectric device including a first electrode formed at a side of the second surface of the vibration cavity forming base portion, a piezoelectric layer laminated on the first electrode, and a second electrode laminated on the piezoelectric layer; and a liquid supply port and a liquid discharge port for supplying and discharging the liquid to and from the cavity, the method comprising:

a head cleaning step of performing a head cleaning operation after maintaining for a predetermined time or longer a state there is no flow of fluid into and from the cavity through the liquid supply port and the liquid discharge port; and a detecting step of detecting presence or absence of the liquid by applying a drive signal to the piezoelectric device of the liquid sensor after the head cleaning operation.

(2). The liquid detecting method according to (1), wherein the head cleaning operation is one of a flushing operation and an ink suction operation.

(3). The liquid detecting method according to (1), wherein the predetermined time is a lapse time of from a time point of ending a preceding ink suction operation in head cleaning.

(4). The liquid detecting method according to (1), wherein the predetermined time is a lapse time of from a time point of ending a printing operation.

(5). The liquid detecting method according to (1), wherein the predetermined time is 2 seconds or longer.

(6). The liquid detecting method according to (1), wherein a liquid to be ejected or sucked in the cleaning operation is in an amount of greater than a volume of the cavity.

(7). The liquid detecting method according to (1), wherein at least one part of the predetermined time is to elapse within an operation time for supplying a printing medium to a predetermined position relative to the liquid ejector.

(8). A liquid detecting system for detecting liquid in a liquid container used in a liquid ejector, the system comprising:

a liquid sensor attached on the liquid container; and a control unit that controls a liquid detecting operation using the liquid sensor, the liquid sensor comprising:

a vibration cavity forming base portion having a first surface and a second surface opposite to each other, in which a cavity for receiving the liquid as a detection object is opened at a side of the first surface, and a bottom of the cavity is capable of vibrating;

a piezoelectric device including a first electrode formed at a side of the second surface of the vibration cavity forming base portion, a piezoelectric layer laminated on the first electrode, and a second electrode laminated on the piezoelectric layer; and a liquid supply port and a liquid discharge port for supplying and discharging the liquid to and from the cavity, wherein the control unit has a head cleaning executing function to perform a head cleaning operation after maintaining for a predetermined time or longer a state there is no flow of fluid into and from the cavity through the liquid supply port and the liquid discharge port, and a detecting executing function to detect a presence or absence of the liquid by applying a drive signal to the piezoelectric device of the liquid sensor after the head cleaning operation.

(9). The liquid sensor system according to (8), wherein the head cleaning operation is a flushing operation or an ink suction operation.

(10). The liquid sensor system according to (8), wherein the predetermined time is a lapse time of from a time point of ending a preceding ink suction operation in head cleaning.

(11). The liquid sensor system according to (8), wherein the predetermined time is a lapse time of from a time point of ending a printing operation.

(12). The liquid sensor system according to (8), wherein the predetermined time is 2 seconds or longer.

(13). The liquid sensor system according to (8), wherein a liquid to be ejected or sucked in the cleaning step is in an amount of greater than a volume of the cavity.

(14). The liquid sensor system according to (8), wherein at least one part of the predetermined time is to elapse within an operation time for supplying a printing medium to a predetermined position relative to the liquid ejector.

(15). A liquid detecting method for detecting liquid in a liquid container used in a liquid ejector using a liquid sensor, wherein the liquid sensor comprises:

a vibration cavity forming base portion having a first surface and a second surface opposite to each other, in which a cavity for receiving the liquid as a detection object is opened at a side of the first surface, and a bottom of the cavity is capable of vibrating; and a piezoelectric device including a first electrode formed at a side of the second surface of the vibration cavity forming base portion, a piezoelectric layer laminated on the first electrode, and a second electrode laminated on the piezoelectric layer, wherein the method comprises:

a consumption calculating step of calculating an estimated consumption of the liquid in the liquid container depending upon information representative of a relationship of operation amount and liquid consumption in the liquid ejector; and a real consumption detecting step of detecting a real consumption state of the liquid in the liquid container by the liquid sensor in a case the estimated consumption calculated in the consumption calculating step reaches a preset constant percentage.

(16). The liquid detecting method according to (15), wherein the estimated consumption already calculated is reset after detecting the real consumption state in the real consumption detecting step, so that, in a next round of the consumption calculating step, the estimated consumption is calculated from an immediately preceding detecting time point as to the actual consumption state.

(17). The liquid detecting method according to (15), wherein the liquid sensor is attached respectively on a plurality of liquid containers mounted on the liquid ejector, and each of the plurality of liquid containers is subjected to the consumption calculating step so as to calculate each estimated consumption, and wherein when the estimated consumption reaches the constant percentage in at least one of the plurality of liquid containers, the real consumption state is detected on all the plurality of liquid containers in the real consumption detecting step.

(18). The liquid detecting method according to (17), wherein the estimated consumptions already calculated on the plurality of liquid containers are reset after detecting the real consumption state in the real consumption detecting step, so that, in a next round of the consumption calculating step, the estimated consumption is calculated from an immediately preceding detecting time point as to the actual consumption state.

(19). The liquid detecting method according to (15), wherein the constant percentage is set in a range of 5% to 10% in volume of the liquid container.

(20). The liquid detecting method according to (15), wherein the liquid sensor further comprises a liquid supply port and a liquid discharge port for supplying and discharging to and from the cavity, a fluid in the liquid container being to flow into and out of the cavity through the liquid supply port and the liquid discharge port.

(21). The liquid detecting method according to (20), wherein, in the real consumption detecting step, a head cleaning operation is carried out to detect a real consumption state after maintaining for a predetermined time or longer a state there is no flow of fluid into and from the cavity through the liquid supply port and the liquid discharge port.

(22). The liquid detecting method according to (21), wherein the head cleaning operation is one of a flushing operation and an ink suction operation.

(23). The liquid detecting method according to (21), wherein the predetermined time is a lapse time of from a time point of ending a preceding ink suction operation in head cleaning.

(24). The liquid detecting method according to (21), wherein the predetermined time is a lapse time of from a time point of ending a printing operation.

(25). The liquid detecting method according to (21) wherein the predetermined time is 2 seconds or longer.

(26). The liquid detecting method according to (21), wherein a liquid to be ejected or sucked in the cleaning operation is in an amount of greater than a volume of the cavity.

(27). The liquid detecting method according to (21), wherein at least one part of the predetermined time is to elapse within an operation time for supplying a printing medium to a predetermined position relative to the liquid ejector.

(28). A liquid sensor system for detecting liquid in a liquid container used in a liquid ejector, the system comprising:

a liquid sensor attached on the liquid container, the liquid sensor comprising:

a vibration cavity forming base portion having a first surface and a second surface opposite to each other, in which a cavity for receiving the liquid as a detection object is opened at a side of the first surface, and a bottom of the cavity is capable of vibrating; and a piezoelectric device including a first electrode formed at a side of the second surface of the vibration cavity forming base portion, a piezoelectric layer laminated on the first electrode, and a second electrode laminated on the piezoelectric layer;

a consumption calculating unit that calculates an estimated consumption of the liquid in the liquid container depending upon information representative of a relationship of operation amount and liquid consumption of the liquid ejector; and a liquid detecting control unit that controls a liquid detecting operation using the liquid sensor, the liquid detecting control unit being to drive the liquid sensor and detect a real consumption state of the liquid in the liquid container in a case the estimated consumption calculated by the consumption calculating unit reaches a preset constant percentage.

(29). The liquid sensor system according to (28), wherein the consumption calculating unit resets the estimated consumption already calculated after detecting the real consumption state so that the estimated consumption is newly calculated from a immediately preceding detecting time point as to the actual consumption state based on the liquid sensor.

(30). The liquid sensor system according to (28), wherein the liquid sensor is attached respectively on a plurality of liquid containers mounted on the liquid ejector, and the consumption calculating unit calculates each estimated consumption on the plurality of liquid containers, and wherein when the estimated consumption reaches the constant percentage in at least one of the plurality of liquid containers, the liquid detecting control unit detects the real consumption state on all the plurality of liquid containers.

(31). The liquid detecting-system according to (30), wherein the liquid detecting control unit resets the estimated consumptions already calculated on the plurality of liquid containers after detecting the real consumption state so that the estimated consumption is newly calculated from a immediately preceding detecting time point as to the actual consumption state based on the liquid sensor.

(32). The liquid detecting system according to (28), wherein the constant percentage is set in a range of 5% to 10% in volume of the liquid container.

(33). The liquid detecting system according to (28), wherein the liquid sensor further comprises a liquid supply port and a liquid discharge port for supplying and discharging to and from the cavity, a fluid in the liquid container being to flow into and out of the cavity through the liquid supply port and the liquid discharge port.

(34). The liquid detecting system according to (33), wherein, in the real consumption detecting, a head cleaning operation is carried out to detect a real consumption state after maintaining for a predetermined time or longer a state there is no flow of fluid into and from the cavity through the liquid supply port and the liquid discharge port.

(35). The liquid detecting system according to (34), wherein the head cleaning operation is one of a flushing operation and an ink suction operation.

(36). The liquid detecting system according to (34), wherein the predetermined time is a lapse time of from a time point of ending a preceding ink suction operation in head cleaning.

(37). The liquid detecting system according to (34), wherein the predetermined time is a lapse time of from a time point of ending a printing operation.

(38). The liquid detecting system according to (34), wherein the predetermined time is 2 seconds or longer.

(39). The liquid detecting system according to (34), wherein a liquid to be ejected or sucked in the cleaning operation is in an amount of greater than a volume of the cavity.

(40). The liquid detecting system according to (34), wherein at least one part of the predetermined time is to elapse within an operation time for supplying a printing medium to a predetermined position relative to the liquid ejector.

BRIEF DESCRIPTION OF THE DRAWINGS

FIGS. 6A to 6B are exploded views of a part of an electrode and piezoelectric layer of the liquid sensor shown in FIG. 2, wherein FIG. 6A shows an electrode terminal pattern, FIG. 6B an upper electrode pattern, FIG. 6C a piezoelectric layer pattern and FIG. 6D a lower electrode and auxiliary electrode pattern.

FIGS. 7A to 7C are exploded views of a part of a substrate of the liquid sensor shown in FIG. 2, wherein FIG. 7A shows a vibration plate, FIG. 7B a cavity plate and FIG. 7C an exit/entrance plate.

FIGS. 8A and 8B are views showing an ink cartridge having the liquid sensor shown in FIG. 2, wherein FIG. 8A is a side view and FIG. 8B is a front view.

FIGS. 9A and 9B are figure showing a drive pulse waveform and inverse electromotive force waveform in the liquid sensor according to the embodiment of the invention, wherein FIG. 9A is a waveform diagram in the case there is ink in the cavity while FIG. 9B is a waveform diagram in the case there is no ink in the cavity.

FIGS. 13A to 13D are exploded views of the part of the electrode and piezoelectric layer of liquid sensor shown in FIG. 12, wherein FIG. 13A shows an electrode terminal pattern, FIG. 13B an upper electrode pattern, FIG. 13C a piezoelectric layer pattern and FIG. 13D a lower electrode and auxiliary electrode pattern.

FIGS. 16A to 16C are views showing a liquid sensor in the prior art, wherein FIG. 16A is a plan view, FIG. 16B is a cross-sectional view taken along line XVIB-XVIB in FIG. 16A and FIG. 16C is a cross-sectional view taken along line XVIC-XVIC in FIG. 16A.

DETAILED DESCRIPTION OF THE INVENTION

With reference to the drawings, explanation is now made on a liquid detecting system and a liquid detecting method using the liquid detecting system according to one embodiment of the present invention.

Figure 1:
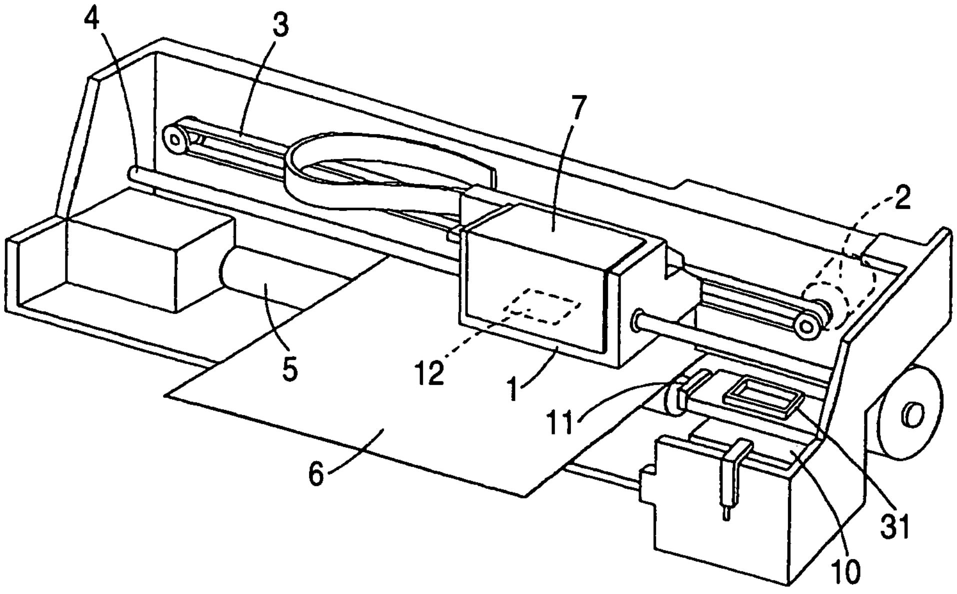
FIG. 1 is a perspective view showing a schematic construction of an inkjet recorder to which is applied a liquid detecting method according to one embodiment of the present invention.

FIG. 1 shows a schematic construction of an inkjet recorder to which a liquid detecting method according to the present embodiment is applied. In FIG. 1, reference numeral 1 is a carriage. The carriage 1 is structured to be reciprocated axially of a platen 5 while being guided by a guide member 4, through a timing belt 4 driven by a carriage motor 2.

An inkjet recording head 12 is mounted on the carriage 1 at a side opposed to a recording paper (printing medium) 6, on which is removably attached an ink cartridge 7 for supplying ink to the recording head 12. The ink remaining quantity in ink cartridge 7 is to be detected by the liquid detecting system and liquid detecting method according to the invention.

A cap member 31 is arranged in a home position (right in the figure) as a non-printing region of the recording apparatus. The cap member 31 is structured such that, when the recording head mounted on the carriage 1 moves to the home position, it is urged on a nozzle surface of the recording head, to thereby form a closed space cooperatively with the nozzle surface. In the below of the cap member 31, a pump unit 10 is arranged to provide a negative pressure to the closed space formed by the cap member 31 and perform a cleaning, etc.

In the cap member 31 at a side close to the printing region, wiping means 11 having an elastic plate, such as of rubber, is arranged to advance and retract horizontally relative to a moving path of the recording head, for example. When the carriage 1 reciprocates towards the cap member 31, the recording-head nozzle surface can be wiped as required.

Figure 4:
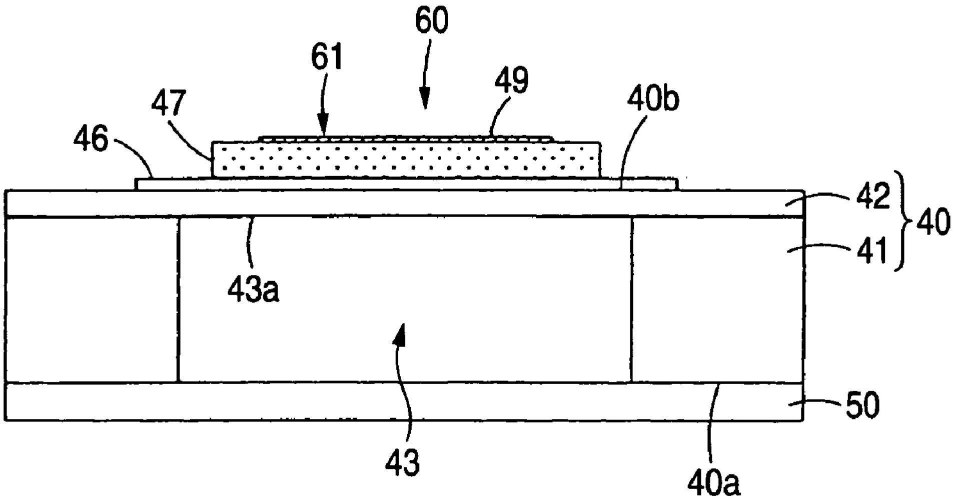
FIG. 4 is a cross-sectional view taken along line IV-IV on the liquid sensor shown in FIG. 2.
Figure 5:
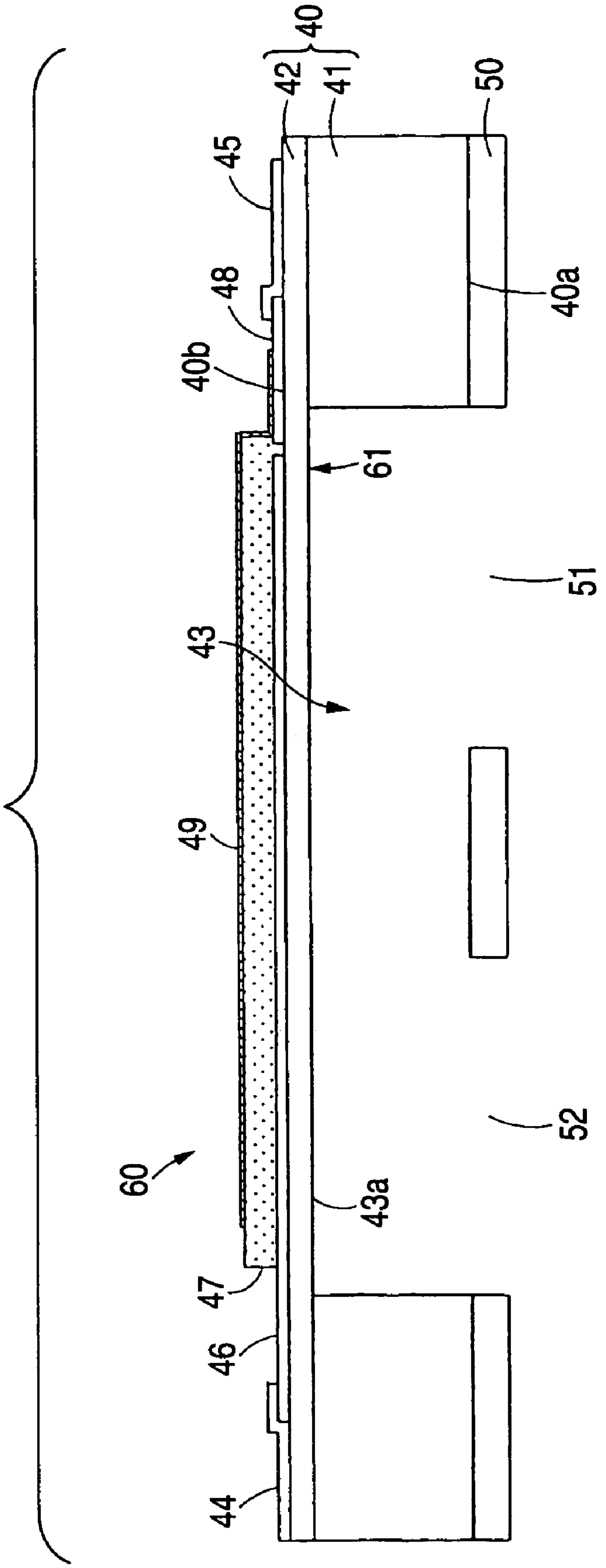
FIG. 5 is a cross-sectional view taken along line V-V on the liquid sensor shown in FIG. 2.

FIGS. 2 to 7C show a liquid sensor 60 constituting a part of the liquid detecting system of this embodiment. The liquid sensor 60 has a vibration cavity forming base portion 40 structured by laying a vibration plate 42 on a cavity plate 41 as shown in FIG. 5. The vibration cavity forming base portion 40 has a first surface 40*a* and a second surface 40*b* that are opposite to each other.

The vibration cavity forming base portion 40 is formed with a cavity 43 for receiving a medium (ink) as a subject-of-detecting, in a manner opened in the first surface 40*a*. Thus, a bottom portion 43*a* of the cavity 43 is formed to vibrate at the vibration plate 42. In other words, the region to actually vibrate of the vibration plate 42 entirety is defined its contour by the cavity 43.

Figure 2:
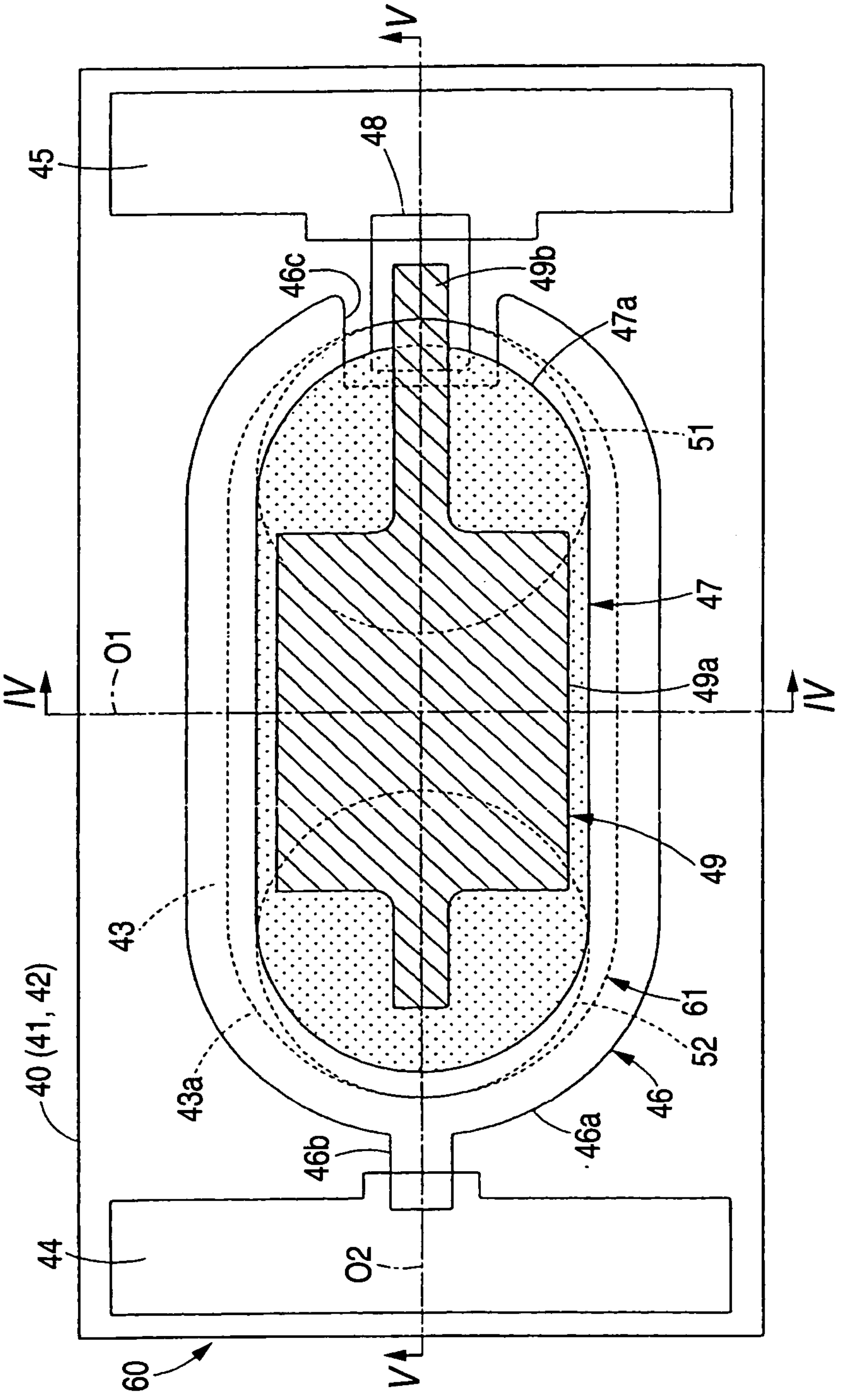
FIG. 2 is a plan view showing a liquid sensor structuring a part of a liquid detecting system according to one embodiment of the invention.
Figure 3:
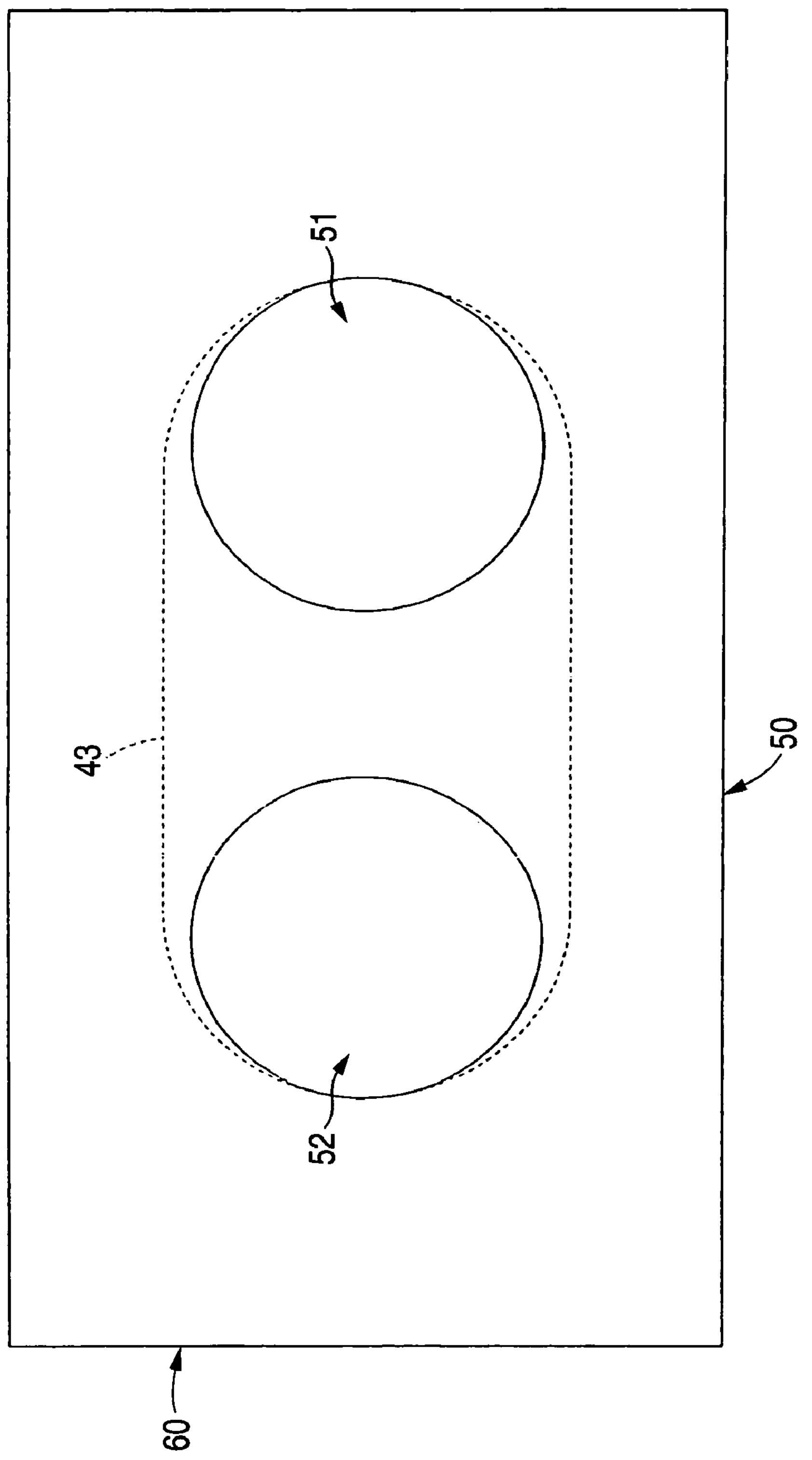
FIG. 3 is a bottom view showing the liquid sensor shown in FIG. 2.

As shown in FIG. 2, the cavity 43 has a plan form having a first symmetric axis O1 and a second symmetric axis O2 that are orthogonal to each other, thus having a longitudinal size along the second symmetric axis O2 set longer than a widthwise size along the first symmetric axis O1.

A lower electrode terminal 44 and an upper electrode terminal 45 are formed at respective ends of the vibration cavity forming base portion 40, on the second surface 40*b* thereof.

Furthermore, a lower electrode (first electrode) 46 is formed on the second surface 40*b* of the vibration cavity forming base portion 40. The lower electrode 46 has a main portion 46*a* formed nearly in the same form as the cavity 43 and greater in size than the cavity 43, and an extended portion 46*b* extended from the main portion 46*a* toward the lower electrode terminal 44 and connected to the lower electrode terminal 44. The main portion 46*a* of the lower electrode 46 covers nearly the entire of the region corresponding to the cavity 43.

The main portion 46*a* of the lower electrode 46 includes a cutout 46*c* formed in a manner recessed inward of the position corresponding to a peripheral edge 43*a* of the cavity 43.

A piezoelectric layer 47 is laid on the lower electrode 46. The piezoelectric layer 47 is formed nearly the same in form as the cavity 43 and smaller in size than the cavity 43. As seen from FIG. 2, the piezoelectric layer 47 in its entirety is placed within a range corresponding to the cavity 43. In other words, the piezoelectric layer 47 does not have at all a portion extending transverse the region corresponding to the peripheral edge 43*a* of the cavity 43.

The piezoelectric layer 47, having a first symmetric axis O1 and a second symmetric axis O2 commonly to those of the cavity 43, is laid on the lower electrode 46 nearly entirely except for the region corresponding to the cutout 46*c* of the lower electrode 46.

Meanwhile, an auxiliary electrode 48 is formed on the second surface 40*b* of the vibration cavity forming base portion 40. The auxiliary electrode 48 extends from the outer of the region corresponding to the cavity 43 to the inner of the region corresponding to the cavity 43 beyond the position corresponding to the peripheral edge 43*a* of the cavity 43. The auxiliary electrode 48 has a part positioned inside the cutout 46*c* of the first electrode 46 thus supporting a part of the piezoelectric layer 47 at the second surface 40*b* of the substrate 40. The auxiliary electrode 48 preferably is of the same material and the same thickness as the lower electrode 46. By thus supporting a part of the piezoelectric layer 47 at the second surface 40*b* of the substrate 40 by the auxiliary electrode 48, the piezoelectric layer 47 is prevented from causing a step therein thereby decreasing the mechanical strength thereof.

On the piezoelectric layer 47, there is laid a main portion 49*a* of the upper electrode (second electrode) 49. The lower electrode 49 wholly is formed smaller in size than the piezoelectric layer 47. Meanwhile, the upper electrode 49 has an extension portion 49*b* that is extended from the main portion 49*a* and connected to the auxiliary electrode 48.

Figure 6A:
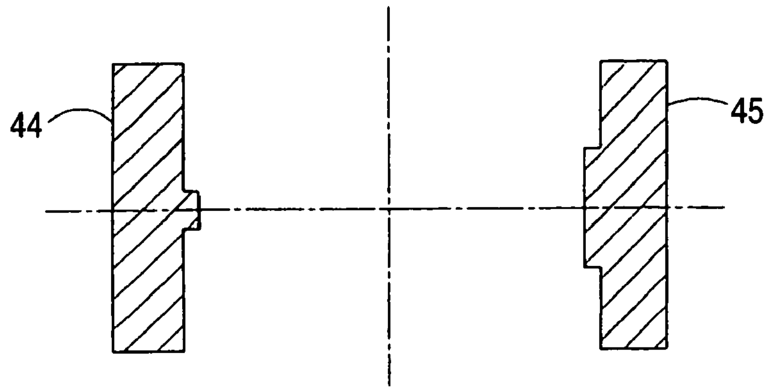
Figure 6B:
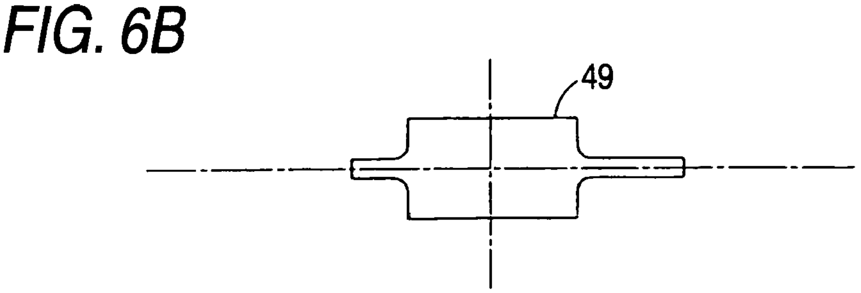
Figure 6C:
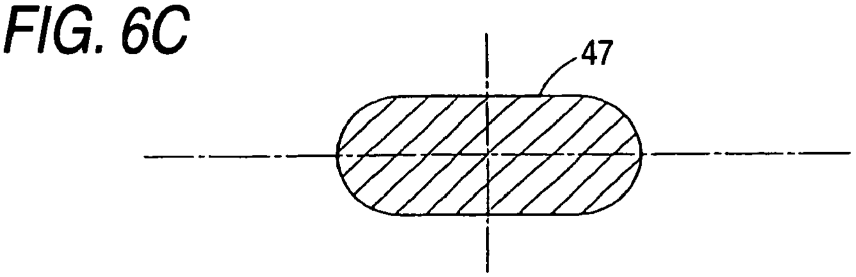
Figure 6D:
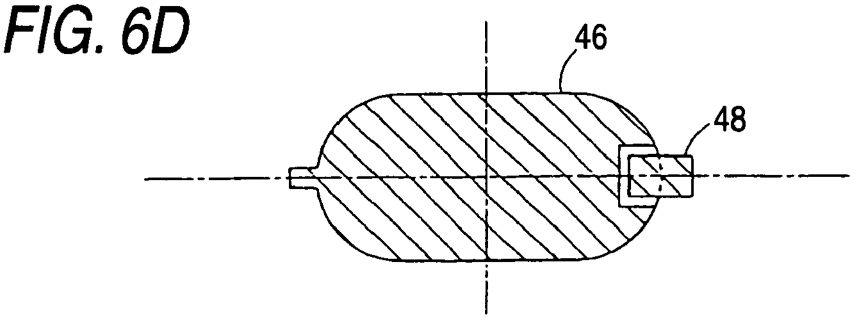
Figure 7A:
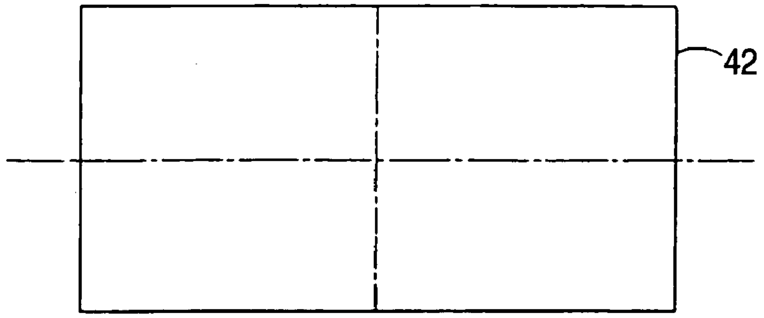
Figure 7B:
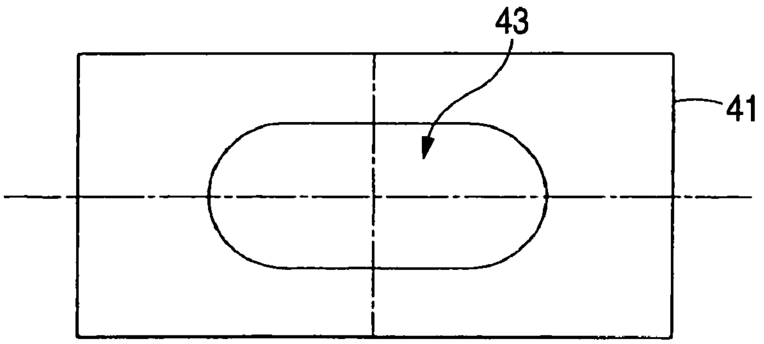
Figure 7C:
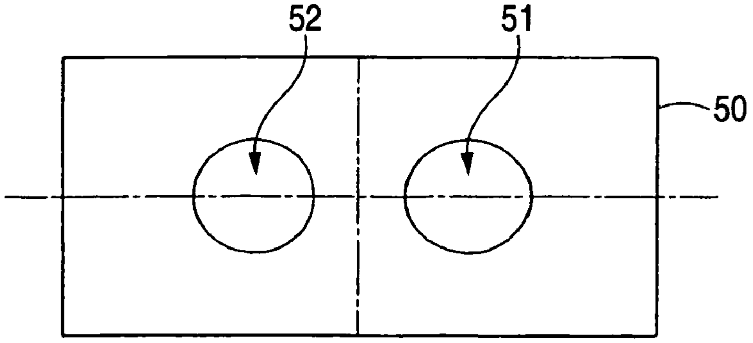

In the liquid sensor 60, the upper electrode 49 is formed nearly cross in form in a manner cutting out the areas corresponding to the four corners of the cavity 43 as shown in FIGS. 2 and 6B, thus having a first symmetric axis O1 and a second symmetric axis O2 commonly to the cavity 43.

A piezoelectric element is formed by the lower electrode 47, the piezoelectric layer 47 and the upper electrode 49. As mentioned above, the piezoelectric layer 47 is structured sandwiched by the upper electrode 49 and the lower electrode 46. This enables to effectively deformably drive the piezoelectric layer 47.

As seen from FIGS. 2 and 5, the upper electrode 49 is electrically connected to the upper electrode terminal 45 through the auxiliary electrode 48. By thus connecting the upper electrode 49 to the upper electrode terminal 45 through the auxiliary electrode 48, it is possible to absorb a step caused due to the total thickness of the piezoelectric layer 47 and lower electrode 47 by means of both the upper electrode 49 and the auxiliary electrode 48. This can prevent the upper electrode 49 from causing a great step therein and decreasing the mechanical strength thereof.

Of the main portion 46*a* of lower electrode 46 and the main portion 49*a* of upper electrode 49 that are electrically connected to the piezoelectric layer 47, the main portion 49*a* of the upper electrode 49 is formed smaller in size. Accordingly, the main portion 49*a* of upper electrode 49 serves to determine a range of are over which piezoelectric effect takes place on the piezoelectric layer 47.

The piezoelectric layer 47, the main portion 49*a* of upper electrode 49 and the main portion 46*a* of lower electrode 46 have their centers coincident with a center of the cavity 43. Meanwhile, the cavity 43 has a center determining a vibratable area of vibration plate 42 located at a center of the liquid sensor 60 overall.

The vibratable area of vibration plate 42 defined by the cavity, the area of main portion 46*a* of lower electrode 46 corresponding to the cavity 43, the piezoelectric layer 47 and the area of upper electrode 49 entirety corresponding to the cavity constitute a vibration portion 61 of the liquid sensor 60. The vibration portion 61 of the liquid sensor 60 has a center coincident with the center of the liquid sensor 60.

Furthermore, as shown in FIGS. 5 and 4, the liquid sensor 60 has an exit/entrance plate 50 laid and bonded on the first surface 40*a* of vibration cavity forming base portion 40. The exit/entrance plate 50 is formed with an ink supply port (liquid supply port) for supplying ink as a subject-of-detecting into the cavity 43 and an ink discharge port (liquid discharge port) for discharging ink as a subject-of-detecting out of the cavity 43.

The ink supply port 51 and the ink discharge port 52 are arranged inside the region corresponding to the cavity 43, in positions corresponding to lengthwise respective ends of the cavity 43. Meanwhile, the ink supply port 51 and the ink discharge port 52 are aligned at their edges with the lengthwise end edges of the cavity 43. The ink supply port 51 and the ink discharge port 52 are formed equal in form and size to each other.

As noted above, by arranging the ink supply port 51 and the ink discharge port 52 in positions corresponding to lengthwise respective ends of the cavity 43, the distance is increased between the ink supply port 51 and the ink discharge port 52, making it easy to attach the liquid sensor 60 to a container body. Meanwhile, by arranging the ink supply port 51 and the ink discharge port 52 inside the region corresponding to the cavity 43, the liquid sensor 60 can be size-reduced.

The member included in the liquid sensor 60, particularly the cavity plate 41, the vibration plate 42 and the exit/entrance plate 50 are formed of the same material and baked together, thus being formed in one body. By thus baking a plurality of substrates into one body, the liquid sensor 60 is made easy to handle. Besides, by forming the members of the same material, it is possible to prevent the occurrence of cracks due to the difference of linear expansion coefficient.

The piezoelectric layer 47 preferably uses, as a material, lead zirconate titanate (PZT), lead lanthanum zirconate titanate (PLZT) or leadless piezoelectric film not using lead. The cavity plate 41 preferably uses, as a material, zirconia or alumina. Meanwhile, the vibration plate 42 preferably uses the same material as the cavity plate 41. The upper electrode 49, the lower electrode 46, the upper electrode terminal 45 and the lower electrode terminal 44 can use a material having an electric conductivity, e.g. a metal such as gold, silver, copper, platinum, aluminum or nickel.

Figure 8A:
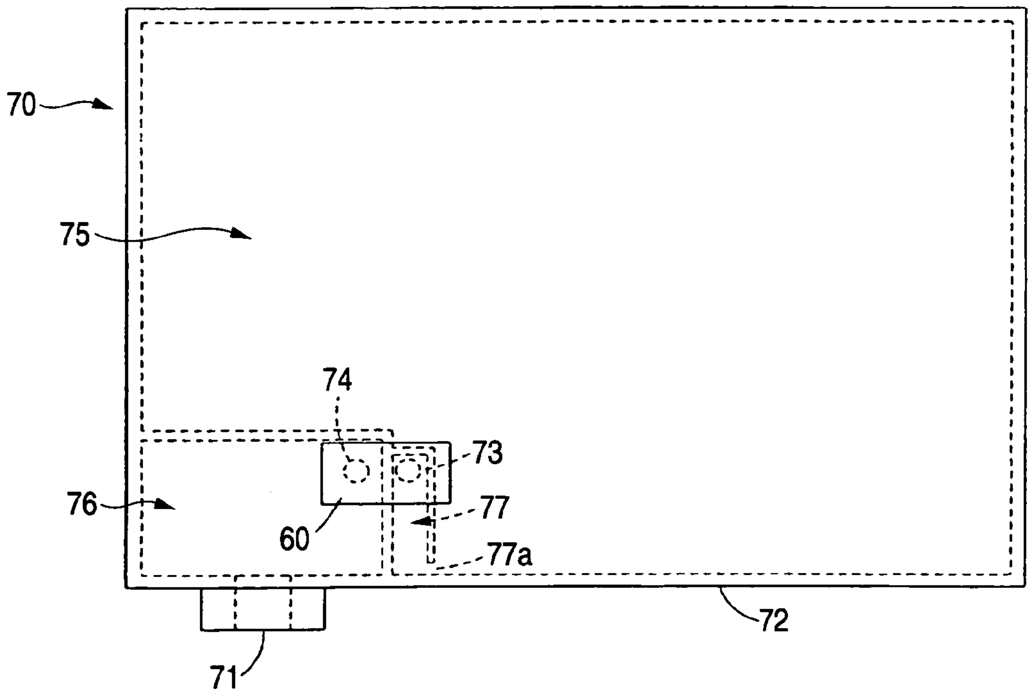
Figure 8B:
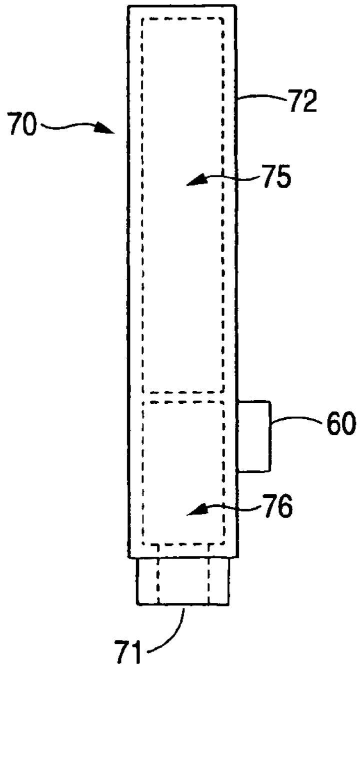

FIG. 8 shows an ink cartridge (liquid container) to which the liquid sensor 60 is attached. The ink cartridge 70 is provided with a container body 72 having an ink outlet port (liquid outlet port) 71 for delivering the ink saved therein to the external.

The liquid sensor 60 in its entirety is attached outside the container body 72. The container body 72 has a container wall through-formed with a first opening 73 communicating with the ink supply port 51 and a second opening 74 communicating with the ink discharge port 52.

The container body 72 has an interior demarcated with a main reservoir chamber (first chamber) 75 constituting the major part of the interior space entirety of container body 72 and a sub reservoir chamber (second chamber) 76 having a small volume. The main reservoir chamber 75 and the sub reservoir chamber 76 are separated from each other. The sub reservoir chamber 76 is located closer to the ink outlet port 71 than the main reservoir chamber 75 with respect to ink flow during consuming the ink, thus being communicated with the ink outlet port 71.

The second opening 74, formed in the container wall of container body 72 is in communication with the upper end of the sub reservoir chamber 76 As noted above, the second opening 74 is connected with an exit 52*b* of the ink discharge port 52 of the liquid sensor 60.

Within the main reservoir chamber 75, an auxiliary flow path 77 is formed closed. The auxiliary flow path 77 is formed with an auxiliary flow path entrance 77*a* at a lower end thereof. The auxiliary flow path entrance 77*a* is located at the lower end of within the main reservoir chamber 75. Meanwhile, the auxiliary flow path 77 at its upper end is in communication with a first opening 73 formed in the container wall of container body 72. The first opening 73 forms an exit of the auxiliary flow path As noted above, the ink supply port 51 of the liquid sensor 60 is in communication with the first opening 73 while the ink discharge port 52 is in communication with the second opening 74. Due to this, the ink supply port 51 and ink discharge port 52 of the liquid sensor 60 forms a communication flow path between the main reservoir chamber 75 and the sub reservoir chamber 76.

During consumption of the ink in the ink cartridge 70, the ink in the main reservoir chamber 75 flows from the auxiliary flow path entrance 77*a* into the auxiliary flow path 77, thus flowing to the first opening 73 through the auxiliary flow path 77. The ink flowed out of the first opening 73 enters the cavity 43 through the ink supply port 51 and flows out of the ink discharge port 552 through the cavity 43. The ink, exited the ink discharge port 52, flows into the sub reservoir chamber 76 through the second opening 74. The ink, entered the sub reservoir chamber 76, is supplied to the recording head 12 of inkjet recorder through the ink outlet port 71.

In this manner, this embodiment is structured such that the ink, to be delivered to the ink outlet port 71 through the sub reservoir chamber 76, in its entire is to pass the ink supply port 51 and ink discharge port 52 of the liquid sensor 60 in advance.

In the ink cartridge 70 having the liquid sensor 60, in the case that the ink remains sufficient in the container body 72 and the sub reservoir chamber 76 is filled with ink, the cavity 43 is filled with ink. Meanwhile, when the liquid in the container body 72 of ink cartridge 70 is consumed to use up the ink in the main reservoir chamber 75, the liquid level in sub reservoir chamber 76 drops. When the liquid level comes below the position of cavity 43 of liquid sensor 60, there becomes a state no ink is existent in the cavity 43.

For this reason, the liquid sensor 60 detects a difference of acoustic impedance resulting from the change of state. This allows the liquid sensor 60 to detect whether the container body 72 is in a state ink remains sufficient or in a state ink has been consumed a certain amount or more.

More specifically, in the liquid sensor 60, voltage is applied to between the upper electrode 49 and the lower electrode 46 through the upper electrode terminal 45 and lower electrode terminal 44. Thereupon, an electric field takes place in a region of piezoelectric layer 47 sandwiched between the upper electrode 49 and the lower electrode 46. The piezoelectric layer 47 deforms under the electric field. By deforming the piezoelectric layer 47, flexure vibration occurs in the vibratable area (region corresponding to the bottom portion 43*a* of the cavity 43) of the vibration plate 42. After the piezoelectric layer 47 is forcibly deformed in this manner, in case the application of voltage is cancelled, the flexure vibration remains for the time being on the vibration portion 61 of the liquid sensor 60.

This residual vibration is of free vibration of the vibration portion 61 and in-cavity 43 medium of the liquid sensor 60. Accordingly, by providing the voltage to be applied to the piezoelectric layer 47 as a pulse waveform or a rectangular wave, resonant state can be easily obtained between the vibration portion 61 after applied a voltage and the medium. The residual vibration is of vibration on the vibration portion 61 of the liquid sensor 60, involving deformation of the piezoelectric layer 47. Due to this, the piezoelectric layer 47 generates an inverse electromotive force upon residual vibration. The inverse electromotive force is to be detected through the upper electrode 49, the lower electrode 46, the upper electrode terminal 45 and the lower electrode terminal 44. Because resonant frequency can be specified by an inverse electromotive force detected in this manner, it is possible to detect a presence/absence of ink in the container body 72 of ink cartridge 7 depending upon such a resonant frequency.

Figure 9A:
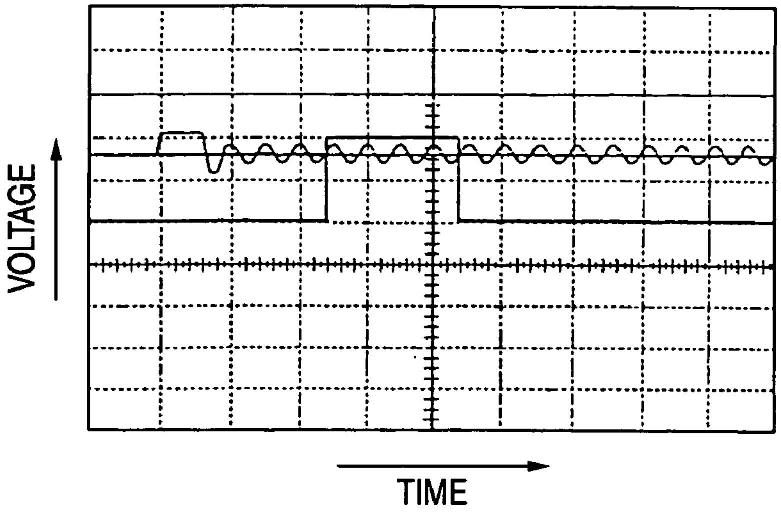
Figure 9B:
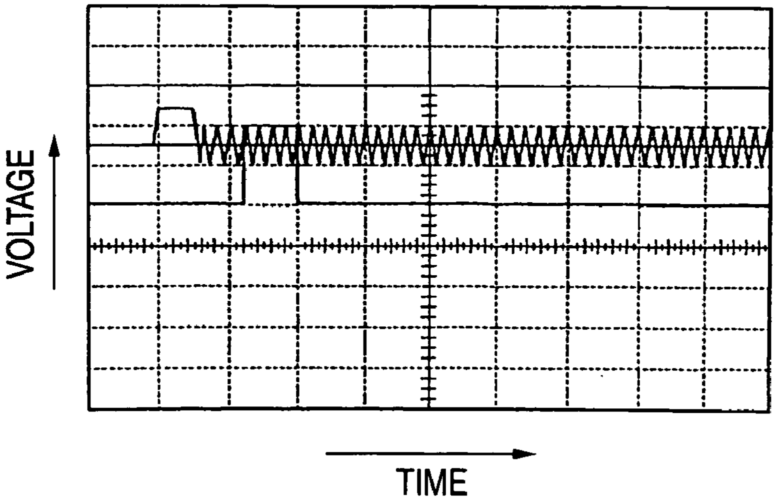

FIGS. 9A and 9B shows a waveform and measuring method of a residual-vibration (free vibration) on the vibration portion 61 of liquid sensor 60 in the case the vibration portion 61 is forcibly vibrated by supplying a drive signal to the liquid sensor 60. FIG. 9A is a waveform in the presence of ink in the cavity 43 of liquid sensor 60 while FIG. 9B is a waveform in the absence of ink in the cavity 43 of liquid sensor 60.

In FIGS. 9A and 9B, the ordinate represents a voltage of inverse electromotive force caused by a drive pulse applied to the liquid sensor 60 and the residual vibration on the vibration portion 61 of liquid sensor 60, while the abscissa represents a time elapsed. The residual vibration on the vibration portion 61 of liquid sensor 60 causes a voltage analog signal waveform. Then, the analog signal is converted (binarized) into a digital numeral corresponding to the signal frequency. In the example shown in FIGS. 9A and 9B, measured is a time for which four pulses of from 4-th to 8-th pulses occur on the analog signal.

More specifically, after the vibration portion 61 is forcibly vibrated by applying a drive pulse to the liquid sensor 60, the number of times is counted which the voltage waveform based on residual vibration crosses a predetermined reference voltage from a lower side to a higher side. Then, a digital signal is generated which is rendered high at from count 4 to count 8, to measure a time of from count 4 to count 8 by means of a predetermined clock pulse.

Comparing between FIGS. 9A and 9B, it can be seen that time of from count 4 to count 8 is longer in FIG. 9A than in FIG. 9B. In other words, the required time of from count 4 to count 8 differs depending upon a presence or absence of ink in the cavity 43 of liquid sensor 60. Utilizing such a difference in time required, it is possible to detect a consumption state of ink.

The reason why count is started at from count 4 on the analog signal is because to start a measurement after stabilizing the residual vibration (free vibration) on the liquid sensor 60. Counting at from count 4 is a mere one example, i.e. measurement may be at from a desired count. Here, signal is detected of from count 4 to count 8, to measure a time of from count 4 to count 8 by means of a predetermined clock pulse. Based on this time, resonant frequency can be determined. There is no need for the clock pulse to measure a time of up to count 8, i.e. measurement may be up to a desired count.

Although time is measured in FIGS. 9A and 9B of from count 4 to count 8, time may be detected at a different interval of count in accordance with a circuit configuration of frequency detection. For example, where ink quality is stable and peak amplitude is in less variation, resonant frequency may be determined by detecting a time of from count 4 to count 6 in order to raise the rate of detection. Meanwhile, where ink quality is unstable and pulse amplitude is in great variation, time detection may be from count 4 to count 12 in order to accurately detect a residual vibration.

In this manner, the liquid sensor 60 can detect whether or not the liquid level passed the mount-position level (exactly, cavity 43 position) of liquid sensor 60 by a frequency change or amplitude change of residual vibration of after forcibly vibrating the vibration portion 61 of liquid sensor 60.

In this embodiment, the upper electrode 49 is formed nearly in a cross form by cutting out the areas thereof corresponding to four corners of cavity 43 as described before. Accordingly, even when the piezoelectric element is forcibly deformed by the application of a drive pulse, deformation amount is small in the areas corresponding to the four corners of the cavity 43. This places the vibration mode of during forcible vibration and the vibration mode of during residual vibration (free vibration) following the forcible vibration into an approximate mode.

Figure 10:
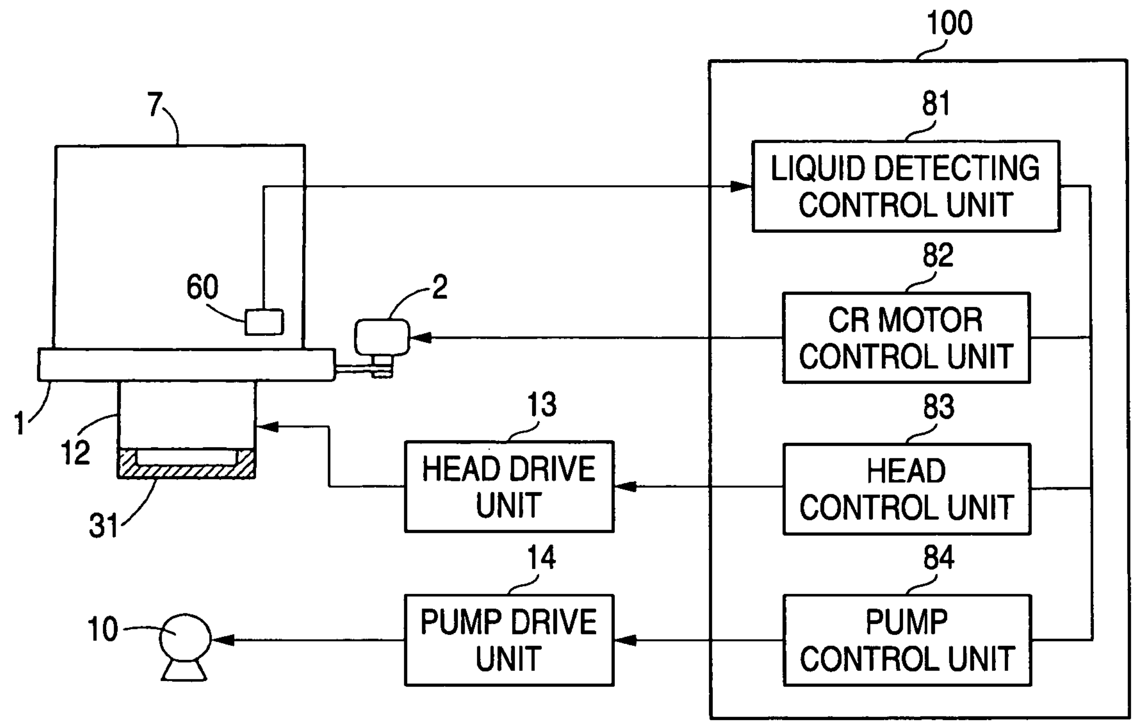
FIG. 10 is a block diagram for explaining a liquid detecting system according to a first embodiment of the invention.

FIG. 10 is a block diagram for explaining a liquid detecting system according to a first embodiment. As shown in FIG. 10, a control device 100 for an inkjet recorder includes liquid detecting control unit 81 for controlling the liquid detecting operation by the liquid sensor 60, carriage motor control unit 82 for controlling the carriage motor (CR motor) 2, head control unit 83 for controlling head drive unit 13 to control the operation of the recording head 12, and pump control unit 84 for controlling pump drive unit 14 to control the operation of the pump unit 10.

In the embodiment, the remaining quantity of ink in the ink cartridge 7 is to be detected as follows by use of the liquid detecting system including the liquid sensor 60 and liquid detecting control unit.

Namely, liquid detecting control unit 81 performs a head cleaning operation after maintaining a state of no fluid (ink and/or air) flow into/out of the cavity 43 through the ink supply port 51 and ink discharge port 52, for a predetermined time, preferably over 2 seconds or more and 5 seconds or less. The head cleaning operation includes a flushing process of operating head drive unit 13 through head control unit 83 to eject ink droplets from the recording head 12 thereby effecting a flushing operation, and a suction process of operating pump drive unit 14 through the pump control unit 84 to suck the ink droplets out of the recording head by use of the pump unit 10. In the head cleaning process, the ejection or suction amount of liquid is set at a volume of cavity 43 or greater.

Figure 11:
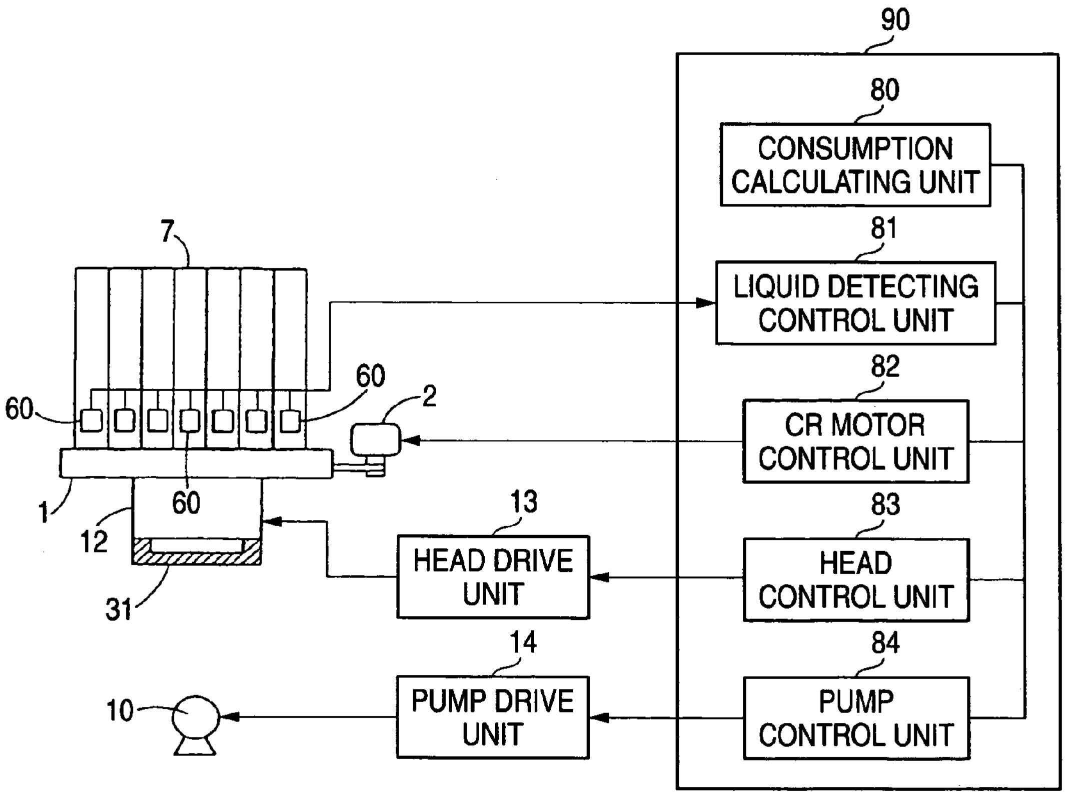
FIG. 11 is a block diagram for explaining a liquid detecting system according to a second embodiment of the invention.

FIG. 11 is a block diagram for explaining the liquid detecting system according to a second embodiment. As shown in FIG. 11, a control device 90 of an inkjet recorder includes consumption calculating unit 80 for calculating an estimated consumption of ink in the ink cartridge 7 depending upon the information representative of a relationship of recording apparatus operation amount and ink consumption, liquid detecting control unit 81 for controlling the liquid detecting operation by the liquid sensor 60, carriage motor control unit 82 for controlling the carriage motor (CR motor) 2, head control unit 83 for controlling head drive unit 13 to control the operation of the recording head 12, and pump control unit 84 for controlling pump drive unit 14 to control the operation of the pump unit 10.

Meanwhile, in this embodiment, liquid sensors 60 are respectively provided on a plurality of ink cartridges 7, as shown in FIG. 11.

In this embodiment, the remaining quantity of ink in the ink cartridge 7 is to be detected as follows by use of the liquid detecting system including the liquid sensor 60 and liquid detecting control unit 81.

Namely, the consumption calculating unit 80 calculates an estimated consumption as to each of the plurality of ink cartridges 7, depending upon the information representative of a relationship between an inkjet printer operation and an ink consumption (consumption calculating process).

Here, the information representative of a relationship between an inkjet recorder operation and an ink consumption includes information representative of a relationship between an operation denoted by the number of ink droplet ejections and an ink consumption denoted as a product of an ink droplet unit volume and the number of ink droplet ejections, information representative of a relationship between an operation denoted by the number of times of head cleaning and an ink consumption denoted as a product of an ink amount to be sucked per head cleaning and the number of times of head cleaning, and so on.

When the estimated consumption calculated in the consumption calculating process reaches a preset constant percentage, preferably a constant percentage set within a range of 5%-10% of the volume of ink cartridge 7, the liquid detecting control unit 81 drives the liquid sensor 60 to detect the real state of ink consumption in the ink cartridge 7 (real consumption detecting process).

More specifically, when estimated consumption reaches the constant percentage in at least one of the plurality of ink cartridges 7, the state of real consumption is detected as to all the plurality of ink cartridges 7 by the real consumption detecting process, and the consumption calculating unit 80 resets the estimated consumption already calculated. The consumption calculation means 80, in the next round of consumption calculating process and subsequent, newly calculates an estimated consumption from the immediately preceding detection time of real consumption state.

Meanwhile, explaining more concretely the real consumption detecting process, the liquid detecting control unit 81, when decided that estimated consumption reached the constant percentage in at least one of the plurality of ink cartridges 7, performs a head cleaning operation after maintaining a state of no fluid (ink and/or air) flow into/out of the cavity 43 through the ink supply port 51 and ink discharge port 52, for a predetermined time, preferably over 2 seconds or more and 5 seconds or less. The head cleaning operation includes a flushing process of operating the head drive unit 13 through the head control unit 83 to eject ink droplets from the recording head 12 thereby effecting a flushing operation, and a suction process of operating the pump drive unit 14 through the pump control unit 84 to suck the ink droplets out of the recording head by use of the pump unit 10. In the head cleaning process, the ejection or suction amount of liquid is set at a volume of cavity 43 or greater.

As described above, according to the present embodiment, each time the estimated consumption calculated in the consumption calculating process by the consumption calculating unit 80 reaches a preset constant percentage, the liquid detecting control unit 81 drives the liquid sensor 60 to perform a real consumption detecting process thereby detecting the real consumption state of ink in the ink cartridge 7. Even when the recording head 12 is moved to the home position in order to carry out a head cleaning in the real consumption detecting process, the presence/absence of ink can be positively detected by the liquid sensor 60 without lowering the throughput during high-speed continuous printing.

Furthermore, when the estimated consumption reaches the constant percentage on at least one of the plurality of ink cartridges 7, the liquid detectors 60 can be driven in all the plurality of ink cartridges 7 by the real consumption detecting process. This makes it possible to suppress to the minimum the labor and time for moving the recording head 12 to the home position and switching over the detecting signal in order to detect a real consumption state.

Explanation is now made on a case of performing a flushing operation in the head cleaning process of the embodiment. Before performing a flushing operation, the state there is no flow in the cavity 43 is maintained for a predetermined time. Due to this, even when an air pathway is formed in the cavity 43 due to an ink suction (head cleaning) performed immediately before the flushing operation, ink is filled in the cavity 43 by the action of a capillary force. By thus carrying out a flushing in the state the cavity 43 is filled with ink, the ink in the cavity 43 can be positively discharged due to the flushing operation.

After ending the flushing process, a presence/absence of ink is detected by applying a drive signal to the piezoelectric element of the liquid sensor 60 (detecting process). Because the ink in the cavity 43 can be positively discharged due to the flushing process performed in advance as described above, it is possible to positively detect a fact that the remaining ink is decreased in amount to a predetermined value or less in the ink cartridge 7.

The predetermined time is a lapse time of from a time of ending an ink suction operation in head cleaning, for example.

Meanwhile, the predetermined time can be provided as a lapse time of from a time of ending a print operation.

Meanwhile, the predetermined time in at least a part thereof may be to pass within an operation time that a recording paper 6 is supplied to a predetermined position relative to the inkjet recorder. This makes it possible to effectively utilize the time for supplying/discharging the recording paper 6.

Likewise, explanation is made on the case of performing a suction operation in the head cleaning process.

Before performing a suction operation, the state of no flow in the cavity 43 is maintained for a predetermined time. Due to this, even when an air pathway is formed in the cavity 43 due to the printing operation performed immediately before the suction operation, ink is filled in the cavity 43 by the action of a capillary force. By thus performing a suction operation in a state the cavity 43 is filled with ink, the ink in the cavity 43 can be positively discharged due to the suction operation.

After ending the suction process, a presence/absence of ink is detected by applying a drive signal to the piezoelectric element of the liquid sensor 60 (detecting process). Because the ink in the cavity 43 can be positively discharged by the suction process carried out previously as described above, it is possible to positively detect a fact that the remaining ink is decreased in amount to a predetermined value or less in the ink cartridge 7.

Meanwhile, the predetermined time is a lapse time of from a time of ending the printing operation, for example.

Meanwhile, the predetermined time in at least a part thereof may be to pass within an operation time that a recording paper 6 is supplied to a predetermined position relative to the inkjet recorder. This makes it possible to effectively utilize the time for supplying/discharging the recording paper 6.

As described above, according to the embodiment, because the presence/absence of ink can be detected by driving the piezoelectric element in a state there is no ink put in the cavity 43 of the liquid sensor, the amount of remaining ink in the ink cartridge 7 can be detected positively.

Meanwhile, in the liquid sensor 60 of the embodiment, by forming the upper electrode 49 nearly in a cross form, vibration mode is approximated between forced vibration and residual vibration following the forced vibration. Accordingly, despite the cavity 43 is provided an elongate form as noted before, the detected signal is reduced of unwanted vibration components thereby enabling positive decision as to a presence/absence of ink.

Meanwhile, in the embodiment, ink supply to the cavity 43 is through the ink supply port 51 while ink discharge from the cavity 43 is through the ink discharge port 52. Accordingly, when the liquid sensor 60 is attached to the ink cartridge 70, the ink in the container body 72 can be supplied to the cavity 43 through the ink supply port 51 without exposing the cavity 43 of liquid detector 60 to the ink containing space in the container body 72 of the ink cartridge 70.

Accordingly, by providing a structure to cause an ink flow into the cavity through the ink supply port 51 and ink discharge port 52 of the liquid sensor 60 during consuming the ink in the ink cartridge ink 70, should an air bubble intrude in the cavity 43, the air bubble is pushed out of the cavity by the flow of ink. This can prevent the liquid sensor 60 from malfunctioning due to the air bubble staying in the cavity 43.

Moreover, according to the embodiment, because the cavity 43 is made in an elongate form instead of circular or square form, the arrangement of an ink supply port 51 and ink discharge port 52 at respective ends lengthwise of the cavity 43 makes it not easy for ink or air bubbles to stay within the cavity 43. This can sufficiently secure the capability of discharging ink or air bubbles and enables positive decision of a presence/absence of ink.

Meanwhile, in the liquid sensor 60 of the embodiment, because there is no need to expose the cavity 43 to the ink containing space in the container body 72, a meniscus can be prevented from being formed in the cavity 43 during the passage of a liquid surface. This can prevent the liquid sensor 60 from erroneously detecting due to the remainder of ink.

Meanwhile, in the ink cartridge 70 of the embodiment, the interior of container body 72 is demarcated as a main reservoir chamber 75 and a sub reservoir chamber 76 that are separated from each other. Furthermore, the main reservoir chamber 75 and the sub reservoir chamber 76 are communicated through the ink supply port 51 and ink discharge port 52, to arrange the cavity of the liquid sensor 60 at a top end of the sub reservoir chamber 76.

Consequently, because the liquid sensor 60 is to positively detect a time that the ink in the main reservoir chamber 75 is used out, the user is allowed to be notified of an upcoming ink-end. Furthermore, the user can be known the number of copies printable, etc. with the remaining ink depending upon the previously-known ink quantity in the sub reservoir chamber 76. It is possible to prevent against exhaustion of ink in the course of printing the page with a result that the printing paper is uselessly spent.

Meanwhile, in the ink cartridge 70 of the embodiment, the closed auxiliary flow path 77 is formed in the main reservoir chamber 75 and the auxiliary flow path entrance 77*a* of auxiliary flow path 77 is arranged at the lower end of the main reservoir chamber 75, wherein the auxiliary flow path 77 at its upper end is communicated with the entrance 51*b* of ink supply port 51. Consequently, the air bubble caused in the main reservoir chamber 75 is not ready to intrude into the auxiliary flow path 77 thus preventing the air bubble from intruding into the cavity 43 of the liquid sensor 60.

Furthermore, in the ink cartridge 70 of the embodiment, the sub reservoir chamber 76 is in a state filled with ink until the ink in the main reservoir chamber 75 is all consumed. Even in the case vibration is applied to the ink cartridge 70, the liquid level does not fluctuate in the sub reservoir chamber 76 as long as there is ink remaining in the main reservoir chamber 75. Accordingly, the liquid sensor 60 is prevented from making an erroneous detection due to liquid level fluctuation.

Meanwhile, according to the liquid sensor 60 of the embodiment, because the contact between the vibration portion 61 and the liquid is limited to the range in which the cavity 43 is present, liquid detecting can be effected in a pinpoint fashion. This allows to detect an ink level with accuracy.

Meanwhile, because the area corresponding to the cavity 43 nearly in its entirety is covered by the main portion 46*a* of the lower electrode 46, there is decreased difference between the deformation mode in forcible vibration and the deformation mode during free vibration. Meanwhile, the vibration portion 60 of liquid sensor 60 has a form symmetric about the center of the liquid sensor 60, the vibration portion 61 has a rigidity nearly equant with respect to the center.

Therefore, the occurrence of unwanted vibration can be prevented which possibly results from structural asymmetry while the reduction in inverse electromotive force output can be prevented which is due to the difference in deformation mode during between forcible vibration and free vibration. This improves the detection accuracy of a resonant frequency to the residual vibration on the vibration portion 61 of the liquid sensor 60 and facilitates the detection of a residual vibration on the vibration portion 61.

Meanwhile, because nearly the entire of the area corresponding to the cavity 43 is covered by the main portion 46*a* of the lower electrode 46 greater in size than the cavity 43, it is possible to prevent the occurrence of unwanted vibration resulting from a positional deviation of the lower electrode 46 during manufacture. Thus, the accuracy of detection is prevented from lowering.

Meanwhile, the piezoelectric layer 47 hard but brittle, in its entirety, is arranged within the area corresponding to the cavity 43, wherein the piezoelectric layer 47 is not existent in the position corresponding to the peripheral edge 43*a* of the cavity 43. Consequently, there is no problem of cracking in the piezoelectric layer in the position corresponding to the cavity peripheral edge.

Figure 12:
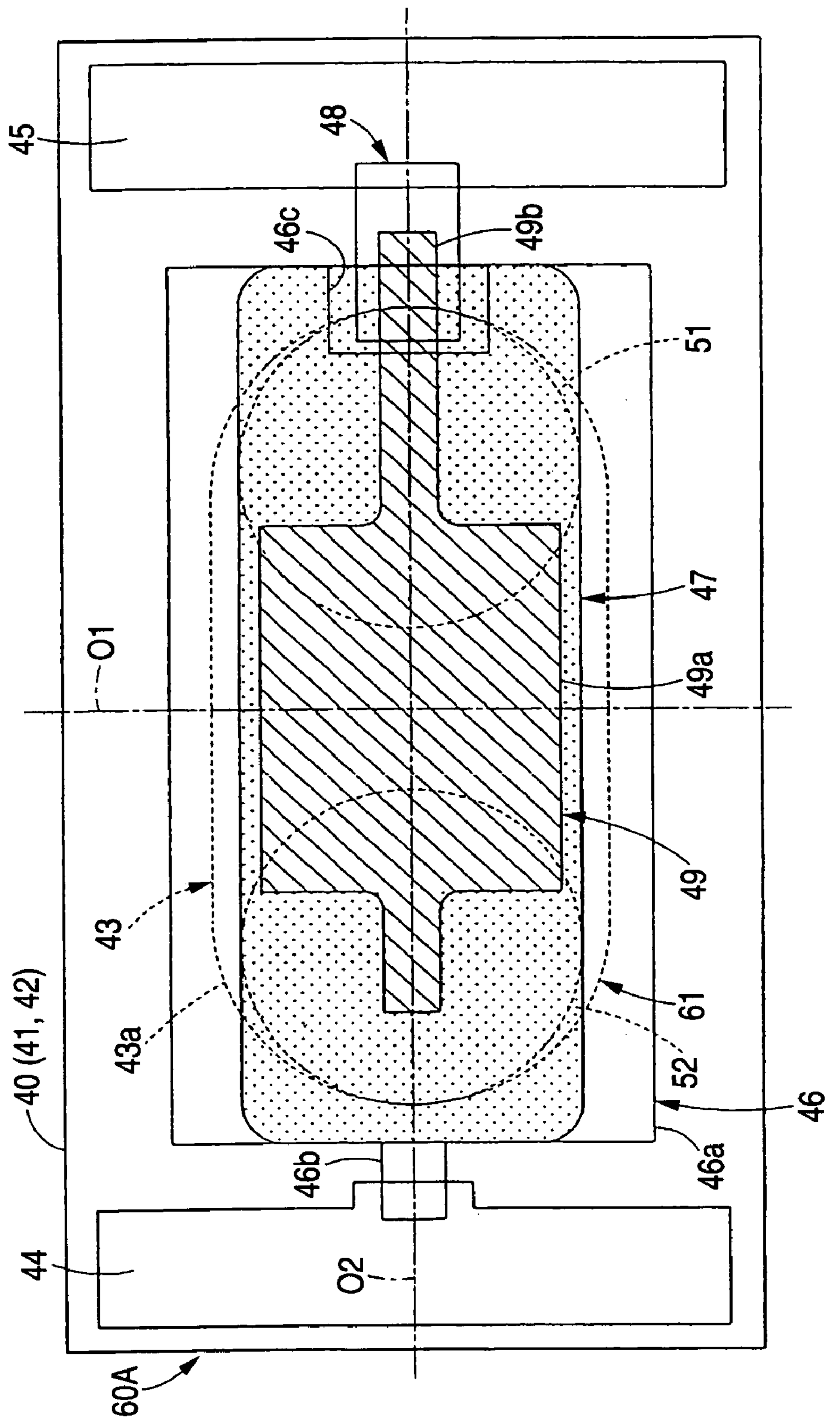
FIG. 12 is a plan view showing a liquid sensor according to another embodiment of the invention.
Figure 13A:
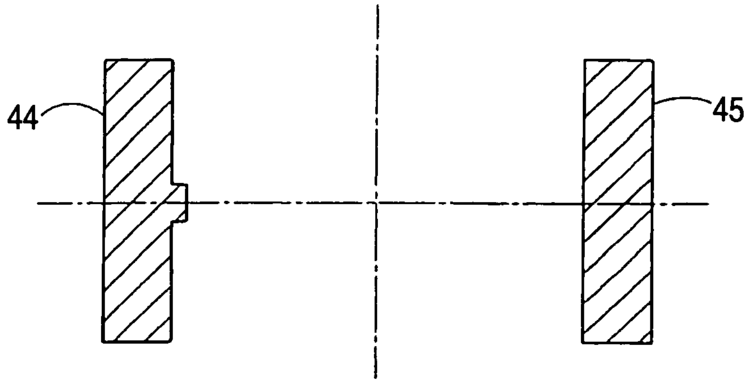
Figure 13B:
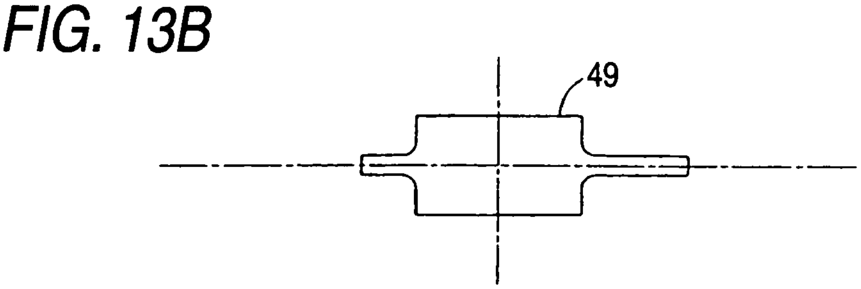
Figure 13C:
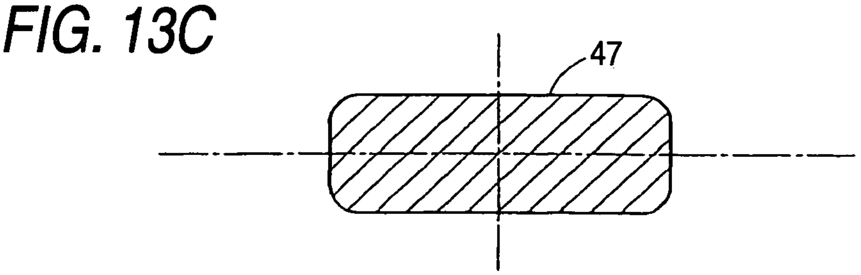
Figure 13D:
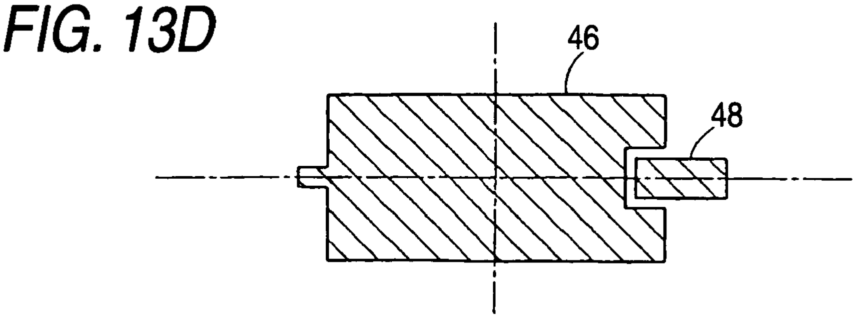

Referring to FIGS. 12 and 13, explanation is next made, as another embodiment of the invention, a modification to the liquid sensor structure. Incidentally, the elements to those of the foregoing embodiment are omitted to explain.

As shown in FIG. 12, in a liquid sensor 60A of this embodiment, a piezoelectric layer 47 is set greater in a size lengthwise (in an extending direction of a second symmetric axis O2) of a cavity 43 than the length of the cavity 43. The piezoelectric layer 47 is formed in a manner covering the entire length of the cavity 43, in a direction lengthwise of the cavity 43. Incidentally, in the widthwise direction (in an extending direction of a first symmetric axis O1), the piezoelectric layer 47 is formed smaller in size than the cavity and inner of the cavity 43.

Furthermore, in the embodiment, a lower electrode 46 is formed nearly rectangular in form. In the direction widthwise of the cavity 43 (in the extending direction of the first symmetric axis O1), the lower electrode 46 has a greater size than the piezoelectric layer 47. In the direction lengthwise of the cavity 43 (in the extending direction of the second symmetric axis O2), the lower electrode 46 and the piezoelectric layer 47 are common in size.

In this embodiment, the occurrence of unwanted vibration can be prevented and the staying of air bubble and ink can be prevented similarly to the above embodiment. By detecting a presence/absence of ink in a state no ink is put in the cavity 43, the remaining quantity of ink in the ink cartridge 7 can be detected positively.

Furthermore, according to the embodiment, the piezoelectric layer has a lengthwise size set greater than the lengthwise size of the cavity 43. Accordingly, even when the piezoelectric layer 47 is formed in a position deviated lengthwise of the cavity 43, there is no change in size of the area contributing to vibration of the entire of the piezoelectric layer 47. This makes it possible to prevent the occurrence of unwanted vibration resulting from a deviation in piezoelectric layer 47 forming position.

Meanwhile, the foregoing embodiment can be structured, as a modification, such that the liquid sensor 60, 60A is omitted of the exit/entrance plate 50 and the first opening 73 and second opening 74 formed in the container body 72 of the ink cartridge 70 is utilized as an ink supply port and ink discharge port to/from the cavity 43 of the liquid sensor 60, 60A. In this structure, the first opening 73 and second opening 74 formed in the container body 72 is to constitute a part of the ink cartridge 70 and a part of the liquid sensor 60, 60A.

Figure 14:
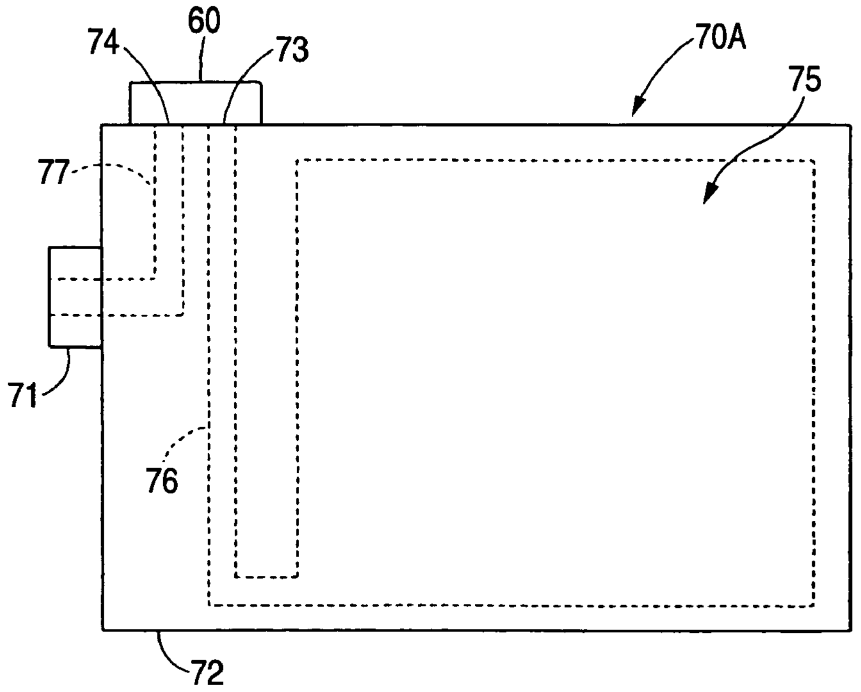
FIG. 14 is a side view having an ink cartridge in one modification to the embodiment.

FIG. 14 shows an ink cartridge (liquid container) 70A on which the liquid sensor 60 is attached, as a modification to the embodiment. The ink cartridge 70A has a container body 72 having, in its front surface, an ink supply port (liquid supply port) 71 for externally supplying the ink reserved therein.

The liquid sensor 60 in its entire is arranged exterior of the container body 72 and attached on an upper surface of the container body 72. In a container wall structuring the upper surface of the container body 72, there are through-formed a first opening 73 communicating with the ink supply port 51 of the liquid sensor 60 and a second opening 74 communicating with the ink discharge port 52.

An ink reservoir chamber 75 is formed at the interior of the container body 72. The ink reservoir chamber 75 and the first opening 73 are connected through a first communication flow path 76 while the second opening 74 and the ink supply port 71 are connected through a second communication flow path 77.

Figure 15:
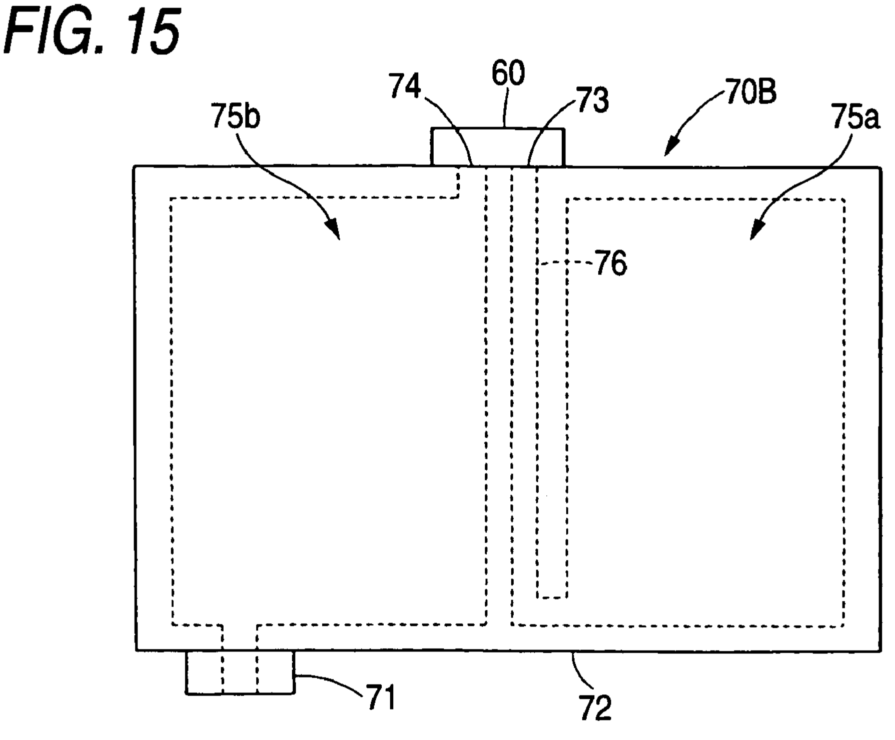
FIG. 15 is a side view having an ink cartridge in another modification to the embodiment.
Figures 16A, 16B, 16C:
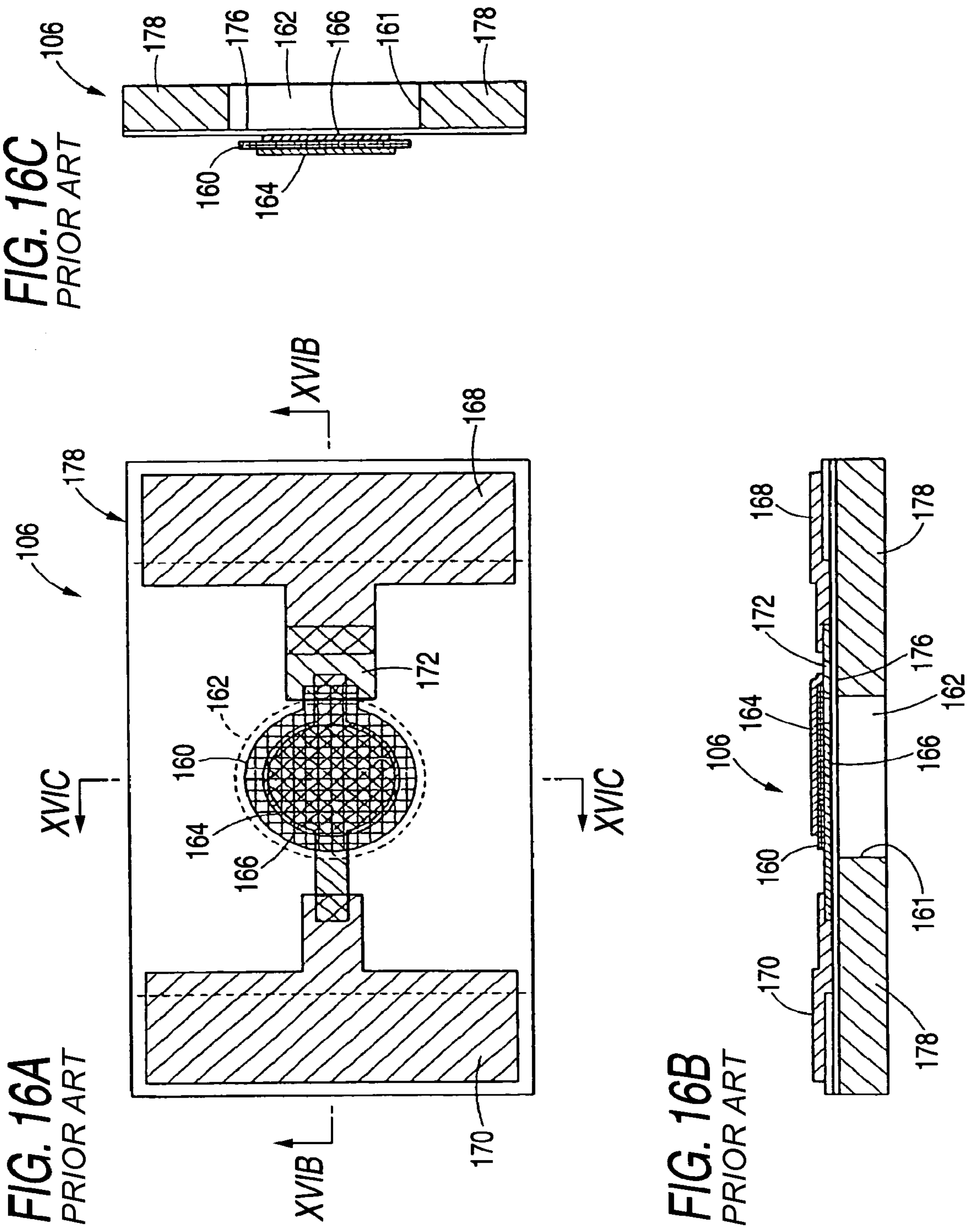
FIG. 16C PRIOR ART
FIG. 16A PRIOR ART
FIG. 16B PRIOR ART
Figure 17:
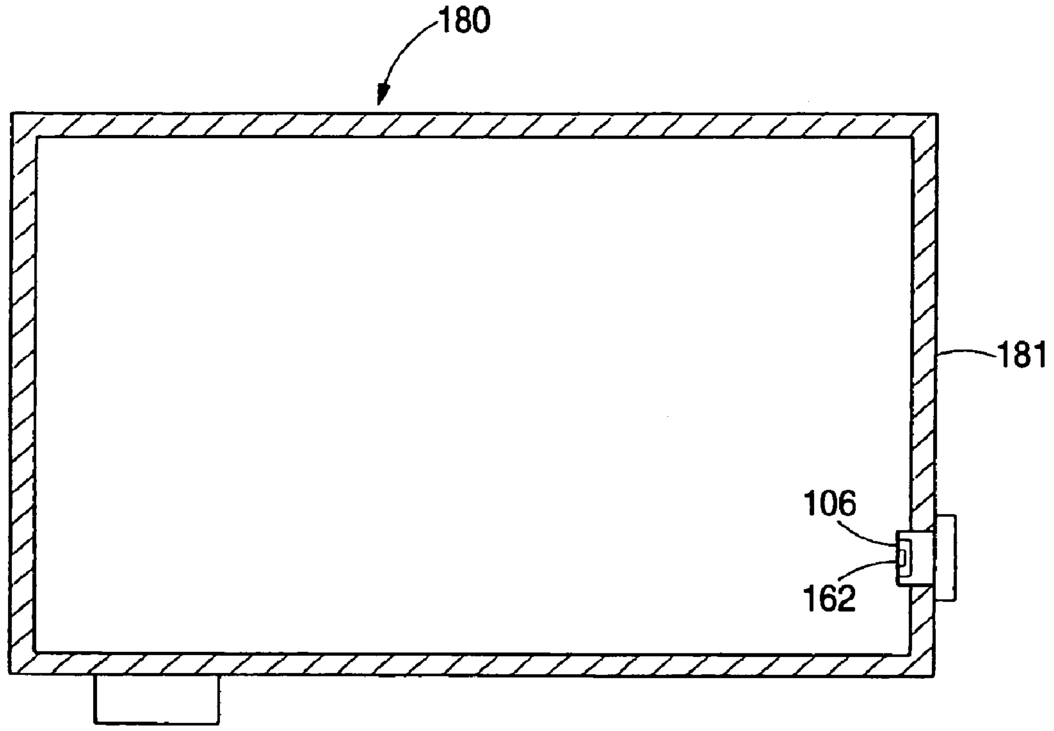
FIG. 17 PRIOR ART
FIG. 17 is a cross-sectional view of an ink cartridge in the prior art having the conventional liquid sensor shown in FIG. 16.

FIG. 15 shows an ink cartridge (liquid container) 70B on which the liquid sensor 60 is attached, as another modification to the embodiment. In this ink cartridge 70B, the container body 72 at its interior is demarcated as a first reservoir chamber 75*a* and a second reservoir chamber 75*b*, wherein the first reservoir chamber 75*a* and the second reservoir chamber 75*b* are separated from each other. The second reservoir chamber 75*b* is located closer to an ink supply port 71 than the first reservoir chamber 75*a* with respect to the ink flow during consuming the ink.

The liquid sensor 60 is attached on the upper surface of the container body 72. In the container wall constituting an upper surface of the container body 72, there are through-formed a first opening. 73 communicating with the ink supply port 51 of the liquid sensor 60 and a second opening 74 communicating with the ink discharge port 52. The first reservoir chamber 75*a* and the first opening 73 are connected through a communication flow path 76 while the second opening 74 is in communication with the second reservoir chamber 75*b*. The ink supply port 71 is provided in a bottom of the container body 72.

In this manner, the first reservoir chamber 75*a* and the second reservoir chamber 75*b* are communicated through the liquid sensor 60. The ink delivered from the first reservoir chamber 75 to the second reservoir chamber 75*b*, in all the amount thereof, is to be passed through the liquid sensor 60.

In the modification shown in FIGS. 14 and 15, by detecting a presence/absence of ink in a state no ink is put in the cavity 43 similarly to the foregoing embodiment, the remaining quantity of ink in the ink cartridge 7 can be detected positively. Other embodiments of the liquid sensor are disclosed in U.S. patent application Ser. No. 11/109,071, filed Apr. 19, 2005, contents of which are hereby incorporated by reference.

What is claimed is:

1. A liquid detecting method for detecting liquid in a liquid container used in a liquid ejector using a liquid sensor, wherein the liquid sensor comprises:

a vibration cavity forming base portion having a first surface and a second surface opposite to each other, in which a cavity for receiving the liquid as a detection object is opened at a side of the first surface, and a bottom of the cavity is capable of vibrating;

a piezoelectric device including a first electrode formed at a side of the second surface of the vibration cavity forming base portion, a piezoelectric layer laminated on the first electrode, and a second electrode laminated on the piezoelectric layer; and a liquid supply port and a liquid discharge port for supplying and discharging the liquid to and from the cavity, the method comprising:

a head cleaning step of performing a head cleaning operation after maintaining for a predetermined time or longer a state where there is no flow of fluid into and from the cavity through the liquid supply port and the liquid discharge port; and a detecting step of detecting presence or absence of the liquid by applying a drive signal to the piezoelectric device of the liquid sensor after the head cleaning operation.

2. The liquid detecting method according to claim 1, wherein the head cleaning operation is one of a flushing operation and an ink suction operation.

3. The liquid detecting method according to claim 1, wherein the predetermined time is a lapse of time from a time point of ending a preceding ink suction operation in head cleaning.

4. The liquid detecting method according to claim 1, wherein the predetermined time is a lapse of time from a time point of ending a printing operation.

5. The liquid detecting method according to claim 1, wherein the predetermined time is 2 seconds or longer.

6. The liquid detecting method according to claim 1, wherein a liquid to be ejected or sucked in the cleaning operation is in an amount greater than a volume of the cavity.

7. The liquid detecting method according to claim 1, wherein at least one part of the predetermined time is to elapse within an operation time for supplying a printing medium to a predetermined position relative to the liquid ejector.

8. A liquid detecting system for detecting liquid in a liquid container used in a liquid ejector, the system comprising:

a liquid sensor attached on the liquid container; and a control unit that controls a liquid detecting operation using the liquid sensor, the liquid sensor comprising:

a vibration cavity forming base portion having a first surface and a second surface opposite to each other, in which a cavity for receiving the liquid as a detection object is opened at a side of the first surface, and a bottom of the cavity is capable of vibrating;

a piezoelectric device including a first electrode formed at a side of the second surface of the vibration cavity forming base portion, a piezoelectric layer laminated on the first electrode, and a second electrode laminated on the piezoelectric layer; and a liquid supply port and a liquid discharge port for supplying and discharging the liquid to and from the cavity, wherein the control unit has a head cleaning executing function to perform a head cleaning operation after maintaining for a predetermined time or longer a state where there is no flow of fluid into and from the cavity through the liquid supply port and the liquid discharge port, and a detecting executing function to detect a presence or absence of the liquid by applying a drive signal to the piezoelectric device of the liquid sensor after the head cleaning operation.

9. The liquid sensor system according to claim 8, wherein the head cleaning operation is a flushing operation or an ink suction operation.

10. The liquid sensor system according to claim 8, wherein the predetermined time is a lapse of time from a time point of ending a preceding ink suction operation in head cleaning.

11. The liquid sensor system according to claim 8, wherein the predetermined time is a lapse of time from a time point of ending a printing operation.

12. The liquid sensor system according to claim 8, wherein the predetermined time is 2 seconds or longer.

13. The liquid sensor system according to claim 8, wherein a liquid to be ejected or sucked in the cleaning step is in an amount greater than a volume of the cavity.

14. The liquid sensor system according to claim 8, wherein at least one part of the predetermined time is to elapse within an operation time for supplying a printing medium to a predetermined position relative to the liquid ejector.

15. A liquid detecting method for detecting liquid in a liquid container used in a liquid ejector using a liquid sensor, wherein the liquid sensor comprises:

a vibration cavity forming base portion having a first surface and a second surface opposite to each other, in which a cavity for receiving the liquid as a detection object is opened at a side of the first surface, and a bottom of the cavity is capable of vibrating; and a piezoelectric device including a first electrode formed at a side of the second surface of the vibration cavity forming base portion, a piezoelectric layer laminated on the first electrode, and a second electrode laminated on the piezoelectric layer, wherein the method comprises:

a consumption calculating step of calculating an estimated consumption of the liquid in the liquid container depending upon information representative of a relationship of operation amount and liquid consumption in the liquid ejector; and a real consumption detecting step of detecting a real consumption state of the liquid in the liquid container by the liquid sensor when the estimated consumption calculated in the consumption calculating step reaches a preset constant percentage.

16. The liquid detecting method according to claim 15, wherein the estimated consumption already calculated is reset after detecting the real consumption state in the real consumption detecting step, so that, in a next round of the consumption calculating step, the estimated consumption is calculated from an immediately preceding detecting time of the real consumption state.

17. The liquid detecting method according to claim 15, wherein the liquid sensor is attached respectively on a plurality of liquid containers mounted on the liquid ejector, and each of the plurality of liquid containers is subjected to the consumption calculating step so as to calculate each estimated consumption, and wherein when the estimated consumption reaches the constant percentage in at least one of the plurality of liquid containers, the real consumption state is detected on all of the plurality of liquid containers in the real consumption detecting step.

18. The liquid detecting method according to claim 17, wherein the estimated consumptions already calculated on the plurality of liquid containers are reset after detecting the real consumption state in the real consumption detecting step, so that, in a next round of the consumption calculating step, the estimated consumption is calculated from an immediately preceding detecting time of the real consumption state.

19. The liquid detecting method according to claim 15, wherein the constant percentage is set in a range of 5% to 10% of volume of the liquid container.

20. The liquid detecting method according to claim 15, wherein the liquid sensor further comprises a liquid supply port and a liquid discharge port for supplying and discharging liquid to and from the cavity, a fluid in the liquid container flowing into and out of the cavity through the liquid supply port and the liquid discharge port.

21. The liquid detecting method according to claim 20, wherein, in the real consumption detecting step, a head cleaning operation is carried out to detect a real consumption state after maintaining for a predetermined time or longer a state where there is no flow of fluid into and from the cavity through the liquid supply port and the liquid discharge port.

22. The liquid detecting method according to claim 21, wherein the head cleaning operation is one of a flushing operation and an ink suction operation.

23. The liquid detecting method according to claim 21, wherein the predetermined time is a lapse of time from a time point of ending a preceding ink suction operation in head cleaning.

24. The liquid detecting method according to claim 21, wherein the predetermined time is a lapse of time from a time point of ending a printing operation.

25. The liquid detecting method according to claim 21 wherein the predetermined time is 2 seconds or longer.

26. The liquid detecting method according to claim 21, wherein a liquid to be ejected or sucked in the cleaning operation is in an amount greater than a volume of the cavity.

27. The liquid detecting method according to claim 21, wherein at least one part of the predetermined time is to elapse within an operation time for supplying a printing medium to a predetermined position relative to the liquid ejector.

28. A liquid sensor system for detecting liquid in a liquid container used in a liquid ejector, the system comprising:

a liquid sensor attached on the liquid container, the liquid sensor comprising:

a vibration cavity forming base portion having a first surface and a second surface opposite to each other, in which a cavity for receiving the liquid as a detection object is opened at a side of the first surface, and a bottom of the cavity is capable of vibrating; and a piezoelectric device including a first electrode formed at a side of the second surface of the vibration cavity forming base portion, a piezoelectric layer laminated on the first electrode, and a second electrode laminated on the piezoelectric layer;

a consumption calculating unit that calculates an estimated consumption of the liquid in the liquid container depending upon information representative of a relationship of operation amount and liquid consumption of the liquid ejector; and a liquid detecting control unit that controls a liquid detecting operation using the liquid sensor, the liquid detecting control unit configured to drive the liquid sensor and detect a real consumption state of the liquid in the liquid container in a case where the estimated consumption calculated by the consumption calculating unit reaches a preset constant percentage.

29. The liquid sensor system according to claim 28, wherein the consumption calculating unit resets the estimated consumption already calculated after detecting the real consumption state so that the estimated consumption is newly calculated from a immediately preceding detecting time of the real consumption state based on the liquid sensor.

30. The liquid sensor system according to claim 28, wherein the liquid sensor is attached respectively on a plurality of liquid containers mounted on the liquid ejector, and the consumption calculating unit calculates each estimated consumption on the plurality of liquid containers, and wherein when the estimated consumption reaches the constant percentage in at least one of the plurality of liquid containers, the liquid detecting control unit detects the real consumption state on all the plurality of liquid containers.

31. The liquid detecting system according to claim 30, wherein the liquid detecting control unit resets the estimated consumptions already calculated on the plurality of liquid containers after detecting the real consumption state so that the estimated consumption is newly calculated from a immediately preceding detecting time of the real consumption state based on the liquid sensor.

32. The liquid detecting system according to claim 28, wherein the constant percentage is set in a range of 5% to 10% of a volume of the liquid container.

33. The liquid detecting system according to claim 28, wherein the liquid sensor further comprises a liquid supply port and a liquid discharge port for supplying and discharging liquid to and from the cavity, a fluid in the liquid container flowing into and out of the cavity through the liquid supply port and the liquid discharge port.

34. The liquid detecting system according to claim 33, wherein, in the real consumption detecting, a head cleaning operation is carried out to detect a real consumption state after maintaining for a predetermined time or longer a state where there is no flow of fluid into and from the cavity through the liquid supply port and the liquid discharge port.

35. The liquid detecting system according to claim 34, wherein the head cleaning operation is one of a flushing operation and an ink suction operation.

36. The liquid detecting system according to claim 34, wherein the predetermined time is a lapse of time from a time point of ending a preceding ink suction operation in head cleaning.

37. The liquid detecting system according to claim 34, wherein the predetermined time is a lapse of time from a time point of ending a printing operation.

38. The liquid detecting system according to claim 34, wherein the predetermined time is 2 seconds or longer.

39. The liquid detecting system according to claim 34, wherein a liquid to be ejected or sucked in the cleaning operation is in an amount greater than a volume of the cavity.

40. The liquid detecting system according to claim 34, wherein at least one part of the predetermined time is to elapse within an operation time for supplying a printing medium to a predetermined position relative to the liquid ejector.

* * * * *